US009882671B2

(12) United States Patent
Nakada

(10) Patent No.: US 9,882,671 B2
(45) Date of Patent: Jan. 30, 2018

(54) OPTICAL RECEPTION APPARATUS, OPTICAL TRANSMISSION APPARATUS, OPTICAL COMMUNICATION SYSTEM, OPTICAL COMMUNICATION METHOD, AND STORAGE MEDIUM STORING PROGRAM

(71) Applicant: NEC CORPORATION, Tokyo (JP)

(72) Inventor: Tatsuhiro Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/915,626

(22) PCT Filed: Sep. 11, 2014

(86) PCT No.: PCT/JP2014/004671
§ 371 (c)(1),
(2) Date: Feb. 29, 2016

(87) PCT Pub. No.: WO2015/045303
PCT Pub. Date: Apr. 2, 2015

(65) Prior Publication Data
US 2016/0261363 A1 Sep. 8, 2016

(30) Foreign Application Priority Data
Sep. 26, 2013 (JP) .................................. 2013-199940

(51) Int. Cl.
*H04J 14/00* (2006.01)
*H04B 10/00* (2013.01)
(Continued)

(52) U.S. Cl.
CPC ........ *H04J 14/0258* (2013.01); *H04B 10/038* (2013.01); *H04B 10/29* (2013.01);
(Continued)

(58) Field of Classification Search
None
See application file for complete search history.

(56) References Cited

U.S. PATENT DOCUMENTS 4,190,821 A * 2/1980 Woodward ............. H04B 1/745
370/223
5,537,393 A * 7/1996 Shioda ..................... H04J 3/085
370/223
(Continued)

FOREIGN PATENT DOCUMENTS

EP 2 337 247 A1 6/2011
EP 2 348 660 A1 7/2011
(Continued)

OTHER PUBLICATIONS

Japanese Office Action dated Sep. 6, 2016 with a partial English translation thereof.
(Continued)

*Primary Examiner* — Ken N Vanderpuye
*Assistant Examiner* — Jai Lee
(74) *Attorney, Agent, or Firm* — McGinn IP Law Group, PLLC

(57) ABSTRACT

An optical signal transmitted by another terminal device that was used for compensation could be received by a device that is not the intended destination of said optical signal, resulting in the problem that confidentiality cannot be guaranteed for the information in said optical signal. This optical reception device is characterized by the provision of the following: a receiving means via which wavelength-multiplexed signal light is inputted; and a transmitting means that, in accordance with an identifier in an optical signal of a prescribed wavelength in the inputted wavelength-multiplexed signal light, forwards said optical signal.

6 Claims, 32 Drawing Sheets

(51) Int. Cl.
  *H04J 14/02*    (2006.01)
  *H04B 10/038*   (2013.01)
  *H04B 10/66*    (2013.01)
  *H04B 10/29*    (2013.01)
  *H04B 10/293*   (2013.01)

(52) U.S. Cl.
  CPC ............ *H04B 10/66* (2013.01); *H04J 14/021* (2013.01); *H04J 14/0221* (2013.01); *H04B 10/293* (2013.01); *H04J 14/0201* (2013.01)

(56) References Cited

U.S. PATENT DOCUMENTS

| | | | | |
|---|---|---|---|---|
| 5,901,137 | A * | 5/1999 | Nakabayashi | H04J 3/085 370/222 |
| 6,097,516 | A * | 8/2000 | Almstrom | H04J 14/021 398/1 |
| 6,407,834 | B1 * | 6/2002 | Takeshita | H04J 14/0227 398/175 |
| 6,539,144 | B1 * | 3/2003 | Lu | H04J 14/0283 385/24 |
| 7,660,526 | B2 * | 2/2010 | Casanova | H04J 14/0204 398/7 |
| 7,936,990 | B2 * | 5/2011 | Yan | H04B 10/032 398/12 |
| 8,665,867 | B2 * | 3/2014 | Wu | H04L 12/24 370/360 |
| 8,798,473 | B2 * | 8/2014 | Inoue | H04B 10/0791 398/10 |
| 2003/0058496 | A1 | 3/2003 | Obeda et al. | |
| 2003/0223745 | A1 * | 12/2003 | Tomofuji | H04J 14/0227 398/9 |
| 2007/0025240 | A1 * | 2/2007 | Snide | H04L 12/40169 370/217 |
| 2014/0255020 | A1 * | 9/2014 | Zhang | H04J 14/0201 398/3 |

FOREIGN PATENT DOCUMENTS

| | | |
|---|---|---|
| EP | 2 541 821 A2 | 1/2013 |
| JP | 2004-007064 A | 1/2004 |
| JP | 2006-180417 A | 7/2006 |
| JP | 2007-522703 A | 8/2007 |
| JP | 2010-098547 A | 4/2010 |
| JP | 2013-115600 A | 6/2013 |

OTHER PUBLICATIONS

Extended European Search Report dated May 10, 2017.
International Search Report (ISR) (PCT Form PCT/ISA/210), in PCT/JP2014/004671, dated Dec. 16, 2014.
PCT/ISA/237 (English version).

\* cited by examiner

Fig. 17

| CONNECTION SOURCE | | CONNECTION DESTINATION | | WAVELENGTH |
|---|---|---|---|---|
| BASE STATION | TRANSPONDER | BASE STATION | TRANSPONDER | |
| A BASE STATION 10-1 | 41-1-A | B BASE STATION 10-2 | 41-1-B | λ1 |
| A BASE STATION 10-1 | 41-2-A | B BASE STATION 10-2 | 41-2-B | λ2 |
| A BASE STATION 10-1 | 41-3-A | B BASE STATION 10-2 | 41-3-B | λ3 |
| A BASE STATION 10-1 | 41-4-A | C BASE STATION 10-3 | 41-1-C | λ4 |
| A BASE STATION 10-1 | 41-5-A | C BASE STATION 10-3 | 41-2-C | λ5 |
| B BASE STATION 10-2 | 41-4-B | D BASE STATION 10-4 | 41-1-D | λ6 |
| B BASE STATION 10-2 | 41-5-B | D BASE STATION 10-4 | 41-2-D | λ7 |
| C BASE STATION 10-3 | 41-3-C | D BASE STATION 10-3 | 41-3-D | λ8 |

Fig. 18

| BASE STATION | TRANSPONDER | IDENTIFIER OF TRANSPONDER | IDENTIFIER OF TRANSPONDER WITH WHICH COMMUNICATION IS TO BE PERFORMED |
|---|---|---|---|
| A BASE STATION 10-1 | 41-1-A | A1 | B1 |
| | 41-2-A | A2 | B2 |
| | 41-3-A | A3 | B3 |
| | 41-4-A | A4 | C1 |
| | 41-5-A | A5 | C2 |
| B BASE STATION 10-2 | 41-1-B | B1 | A1 |
| | 41-2-B | B2 | A2 |
| | 41-3-B | B3 | A3 |
| | 41-4-B | B4 | D1 |
| | 41-5-B | B5 | D2 |
| C BASE STATION 10-3 | 41-1-C | C1 | A4 |
| | 41-2-C | C2 | A5 |
| | 41-3-C | C3 | D3 |
| D BASE STATION 10-4 | 41-1-D | D1 | B4 |
| | 41-2-D | D2 | B5 |
| | 41-3-D | D3 | C3 |

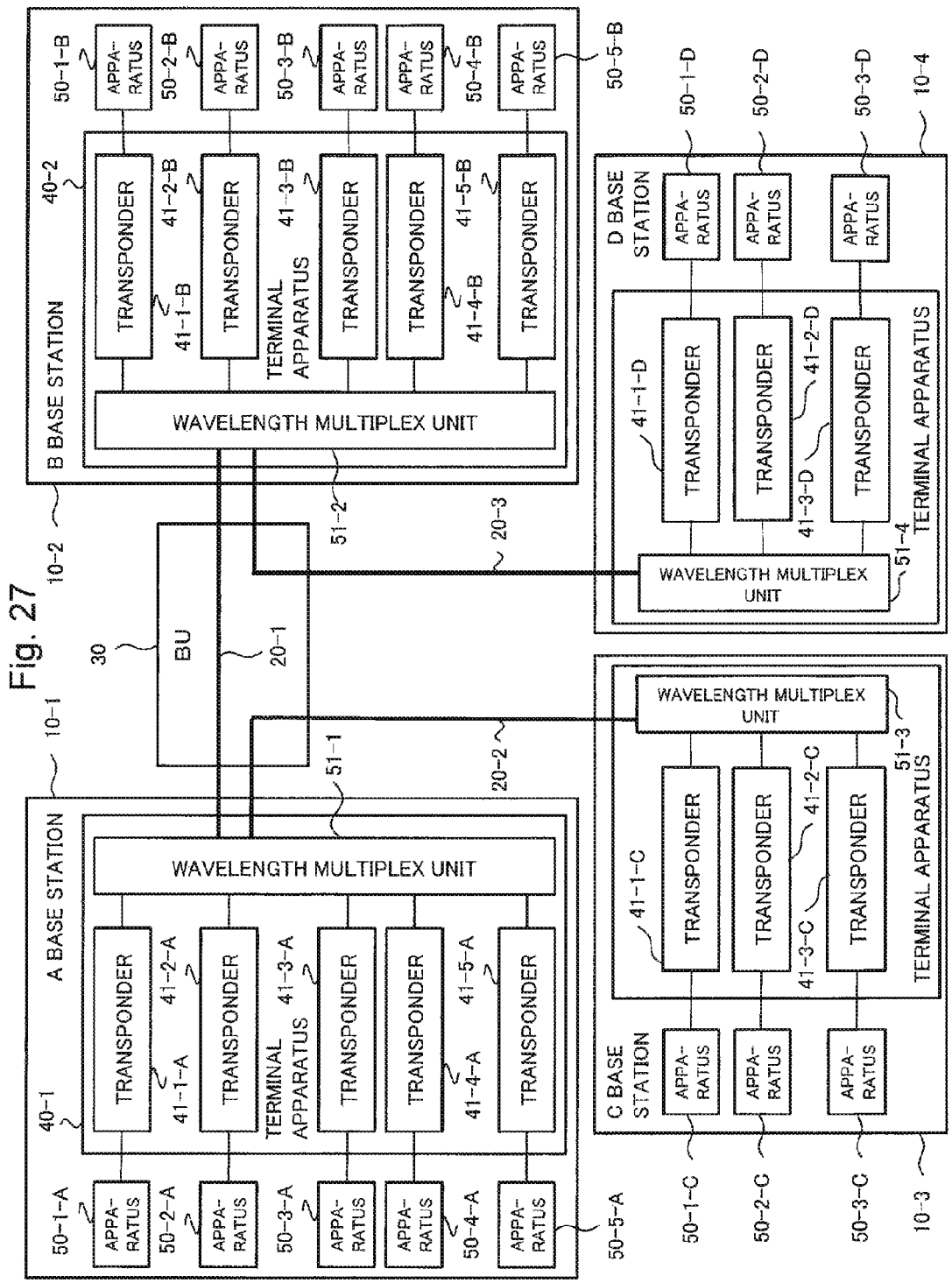

Fig. 28

| | OPTICAL SIGNAL TRANSMITTED IN SECTION BETWEEN A BASE STATION 10-1 AND BU 30 | | OPTICAL SIGNAL TRANSMITTED IN SECTION BETWEEN B BASE STATION 10-2 AND BU 30 |
|---|---|---|---|
| 1 | OPTICAL SIGNAL TRANSMITTED AND RECEIVED BY "A BASE STATION 10-1 41-1-A" AND "B BASE STATION 10-2 41-1-B" | 1 | OPTICAL SIGNAL TRANSMITTED AND RECEIVED BY "A BASE STATION 10-1 41-1-A" AND "B BASE STATION 10-2 41-1-B" |
| 2 | OPTICAL SIGNAL TRANSMITTED AND RECEIVED BY "A BASE STATION 10-1 41-2-A" AND "B BASE STATION 10-2 41-2-B" | 2 | OPTICAL SIGNAL TRANSMITTED AND RECEIVED BY "A BASE STATION 10-1 41-2-A" AND "B BASE STATION 10-2 41-2-B" |
| 3 | OPTICAL SIGNAL TRANSMITTED AND RECEIVED BY "A BASE STATION 10-1 41-3-A" AND "C BASE STATION 10-3 41-1-C" | 3 | OPTICAL SIGNAL TRANSMITTED AND RECEIVED BY "B BASE STATION 10-2 41-3-B" AND "D BASE STATION 10-4 41-1-D" |
| 4 | OPTICAL SIGNAL TRANSMITTED AND RECEIVED BY "A BASE STATION 10-1 41-4-A" AND "C BASE STATION 10-3 41-2-C" | 4 | OPTICAL SIGNAL TRANSMITTED AND RECEIVED BY "B BASE STATION 10-2 41-4-B" AND "D BASE STATION 10-4 41-2-D" |
| 5 | OPTICAL SIGNAL TRANSMITTED AND RECEIVED BY "A BASE STATION 10-1 41-5-A" AND "C BASE STATION 10-3 41-3-C" | 5 | OPTICAL SIGNAL TRANSMITTED AND RECEIVED BY "B BASE STATION 10-2 41-5-B" AND "D BASE STATION 10-4 41-3-D" |

Fig. 30

| | Optical signal transmitted in section between A base station 10-1 and BU 30 | Optical signal transmitted and received by "A base station 10-1 41-1-A" and "B base station 10-2 41-1-B" | Optical signal transmitted and received by "A base station 10-1 41-2-A" and "B base station 10-2 41-2-B" | 3 | 4 | 5 |
|---|---|---|---|---|---|---|
| Optical signal transmitted in section between B base station 10-2 and BU 30 | | | | | | |
| 1 | Optical signal transmitted and received by "A base station 10-1 41-1-A" and "B base station 10-2 41-1-B" | | | | | |
| 2 | Optical signal transmitted and received by "A base station 10-1 41-2-A" and "B base station 10-2 41-2-B" | | | | | |
| 3 | LOST | | | | LOST | |
| 4 | LOST | | | | | LOST |
| 5 | LOST | | | | | LOST |

Fig. 31

| OPTICAL SIGNAL TRANSMITTED IN SECTION BETWEEN A BASE STATION 10-1 AND BU 30 | OPTICAL SIGNAL TRANSMITTED IN SECTION BETWEEN B BASE STATION 10-2 AND BU 30 | 1 | 2 | 3 | 4 | 5 |
|---|---|---|---|---|---|---|
| 1 | OPTICAL SIGNAL TRANSMITTED AND RECEIVED BY "A BASE STATION 10-1 41-1-A" AND "B BASE STATION 10-2 41-1-B" | OPTICAL SIGNAL TRANSMITTED AND RECEIVED BY "A BASE STATION 10-1 41-1-A" AND "B BASE STATION 10-2 41-1-B" | | | | |
| 2 | OPTICAL SIGNAL TRANSMITTED AND RECEIVED BY "A BASE STATION 10-1 41-2-A" AND "B BASE STATION 10-2 41-2-B" | | OPTICAL SIGNAL TRANSMITTED AND RECEIVED BY "A BASE STATION 10-1 41-2-A" AND "B BASE STATION 10-2 41-2-B" | | | |
| 3 | OPTICAL SIGNAL TRANSMITTED AND RECEIVED BY "A BASE STATION 10-1 41-3-A" AND "B BASE STATION 10-2 41-3-B" | | | OPTICAL SIGNAL TRANSMITTED AND RECEIVED BY "A BASE STATION 10-1 41-3-A" AND "B BASE STATION 10-2 41-3-B" | | |
| 4 | OPTICAL SIGNAL TRANSMITTED AND RECEIVED BY "A BASE STATION 10-1 41-4-A" AND "B BASE STATION 10-2 41-4-B" | | | | OPTICAL SIGNAL TRANSMITTED AND RECEIVED BY "A BASE STATION 10-1 41-4-A" AND "B BASE STATION 10-2 41-4-B" | |
| 5 | OPTICAL SIGNAL TRANSMITTED AND RECEIVED BY "A BASE STATION 10-1 41-5-A" AND "B BASE STATION 10-2 41-5-B" | | | | | OPTICAL SIGNAL TRANSMITTED AND RECEIVED BY "A BASE STATION 10-1 41-5-A" AND "B BASE STATION 10-2 41-5-B" |

OPTICAL RECEPTION APPARATUS, OPTICAL TRANSMISSION APPARATUS, OPTICAL COMMUNICATION SYSTEM, OPTICAL COMMUNICATION METHOD, AND STORAGE MEDIUM STORING PROGRAM

TECHNICAL FIELD

The present invention relates to an optical reception apparatus, an optical transmission apparatus, an optical communication system, an optical communication method, and a storage medium storing a program.

BACKGROUND ART

In recent years, as the traffic increases, it is desired to increase the bandwidth of the circuit (line) and achieve higher functionality of the network in the undersea cable system. Therefore, techniques such as OADM (Optical Add-Drop Multiplexer) and ROADM (Reconfigurable Optical Add-Drop Multiplexer) are applied to the undersea cable system.

In the undersea ROADM system, a Wavelength Division Multiplexing (WDM) communication is used, and, for example, a transmission apparatus inputs a client signal as a wavelength multiplexed optical signal into an undersea cable, and multiple paths are accommodated in a single optical fiber, so that the flexibility of the network is improved.

In the undersea cable system having the OADM function, the total power of the signal transmitted in the cable constituted by an optical fiber is configured to be at a constant level, and in a case where some of the wavelength component of the signal is lost because, e.g., the cable is disconnected, the other wavelength components of the signal is amplified, so that the total power of the signal is maintained at a constant level.

However, when the power of only a particular wavelength component of the signal is increased, and the power becomes equal to or more than a predetermined value, a change occurs in the optical spectrum because of, e.g., degradation of the waveform of the signal due to nonlinear effect of the optical fiber, and the transmission quality of the signal is degraded.

An optical communication system described in PTL 1 relates to a technique for ensuring the communication quality by correcting the total power of the signal with dummy light in a case where a fault occurs in a cable. In the optical communication system described in PTL 1, a terminal apparatus (optical transmission apparatus) includes a dummy light generation unit generating dummy light according to a portion where optical signal disconnection occurs, so that the strength (the power) of the transmitted signal is maintained at a constant level, in a case where a fault of cable disconnection occurs.

CITATION LIST

Patent Literature

[PTL 1] Japanese Patent Laid-Open No. 2010-98547

SUMMARY OF INVENTION

Technical Problem

As described above, the terminal apparatus (optical transmission apparatus) described in PTL 1 needs to generate dummy light in order to compensate the optical signal, and is required to have the dummy optical generation unit.

Therefore, in order to compensate the optical signal without providing the dummy optical generation unit in the terminal apparatus (optical transmission apparatus), the lost optical signal may be considered to be compensated by the optical signal transmitted from another terminal apparatus. However, there is a problem in that, when the optical signal transmitted from another terminal apparatus used for the compensation is received by an apparatus which is not the authentic recipient of the optical signal, the confidentiality of the information included in the optical signal cannot be ensured.

It is an object of the present invention to solve the above problems, and to provide an optical reception apparatus, an optical transmission apparatus, an optical communication system, an optical communication method, and a storage medium storing a program which can prevent an optical signal from being transferred to an apparatus that is not the intended transmission destination apparatus and can ensure the confidentiality of information included in the optical signal.

Solution to Problem

An optical reception apparatus according to the present invention comprises: reception means for receiving wavelength multiplexed signal light; and transmission means for transferring an optical signal of a predetermined wavelength in accordance with an identifier included in the optical signal of the predetermined wavelength in the received wavelength multiplexed signal light.

An optical transmission apparatus according to present invention comprises: reception means for receiving an optical signal of a predetermined wavelength; transmission means for incorporating an identifier uniquely identifying the optical transmission apparatus into the optical signal of the predetermined wavelength received by the reception means, and transmitting the optical signal; and multiplex means for multiplexing and outputting the optical signal including the identifier and an optical signal of a wavelength different from the predetermined wavelength.

An optical communication system according to the present invention comprises: an optical transmission apparatus including a first reception means for receiving an optical signal of a predetermined wavelength, a first transmission means for incorporating an identifier uniquely identifying the optical transmission apparatus into the optical signal of the predetermined wavelength received by the first reception means, and transmitting the optical signal, and a multiplex means for multiplexing and outputting the optical signal including the identifier and an optical signal of a wavelength different from the predetermined wavelength; and an optical reception apparatus including a second reception means for receiving wavelength multiplexed signal light transmitted by the optical transmission apparatus, and a second transmission means for transferring the optical signal of the predetermined wavelength in accordance with the identifier included in the optical signal of the predetermined wavelength in the received wavelength multiplexed signal light.

An optical communication method according to the present invention comprises: receiving wavelength multiplexed signal light; and transferring an optical signal of a predetermined wavelength in accordance with an identifier included in the optical signal of the predetermined wavelength in the received wavelength multiplexed signal light.

A storage medium according to the present invention stores a program for causing a computer to execute: processing for receiving wavelength multiplexed signal light; and processing for transferring optical signal of the predetermined wavelength in accordance with the identifier included in the optical signal of the predetermined wavelength in the received wavelength multiplexed signal light.

Advantageous Effects of Invention

The present invention has an advantage in that, in an optical reception apparatus, an optical transmission apparatus, an optical communication system, an optical communication method, and a storage medium storing a program, an optical signal is prevented from being transferred to an apparatus that is not the intended transmission destination apparatus, and the confidentiality of information included in the optical signal can be ensured.

BRIEF DESCRIPTION OF DRAWINGS

FIG. 17 is a table illustrating a connection relationship of transponders of each base station and a used wavelength according to the sixth exemplary embodiment of the present invention.

FIG. 18 is a table illustrating transponders provided in each base station, an identifier of the transponder, and an identifier of a transponder with which the transponder is communicating, according to the sixth exemplary embodiment of the present invention.

FIG. 27 is a figure illustrating an example of a configuration of a communication system before a fault occurs in a transmission path, according to a ninth exemplary embodiment of the present invention.

FIG. 28 is a table illustrating a connection relationship of transponder before a fault that has occurred in a transmission path, according to the ninth exemplary embodiment of the present invention.

FIG. 30 is a figure illustrating a table illustrating another connection relationship of a transponder after a fault that has occurred in a transmission path according to the ninth exemplary embodiment of the present invention.

FIG. 31 is a table illustrating a connection relationship of a transponder after a connection relationship is changed, according to the ninth exemplary embodiment of the present invention.

DESCRIPTION OF EMBODIMENTS

First Exemplary Embodiment

Figure 1:
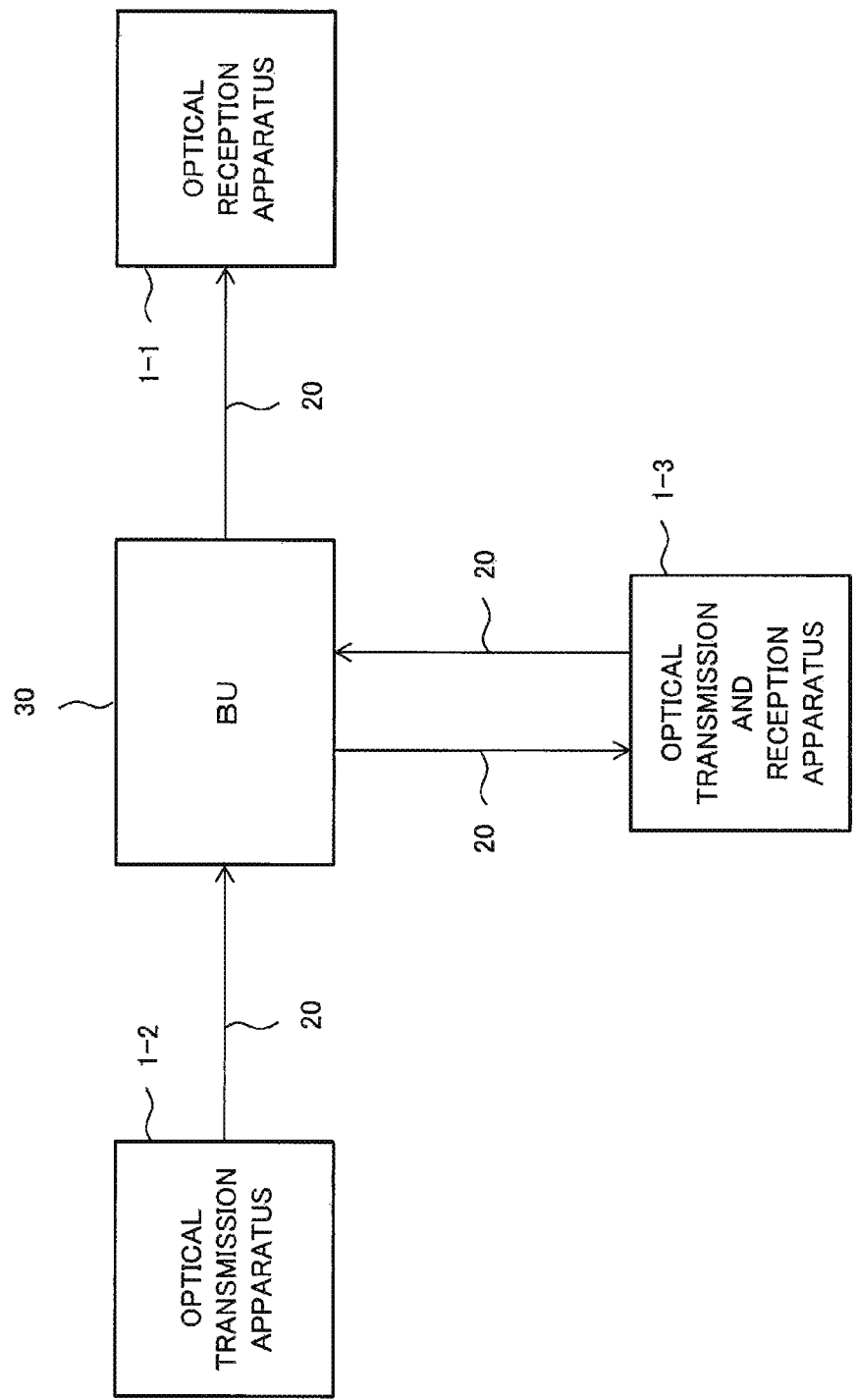
FIG. 1 is a figure illustrating an example of a configuration of an optical communication system according to a first exemplary embodiment of the present invention.

Overview of the first exemplary embodiment of the present invention will be explained with reference to drawings. It should be noted that the reference symbols in the drawings appended to this overview are attached to the elements as an example for the sake of convenience in order to help understanding, and are not intended to limit, in any way, the description of this overview.

FIG. 1 is an example of a configuration of an optical communication system according to the first exemplary embodiment of the present invention. As shown in FIG. 1, the optical communication system includes an optical reception apparatus 1-1 receiving a wavelength multiplexed signal light, an optical transmission apparatus 1-2 transmitting wavelength multiplexed signal light, and an optical transmission and reception apparatus 1-3 transmitting and receiving wavelength multiplexed signal light. Further, the optical communication system includes a transmission path 20 transmitting wavelength multiplexed signal light and a BU (Branch Unit: optical branch apparatus) 30 multiplexing and branching wavelength multiplexed signal light.

Figure 2:
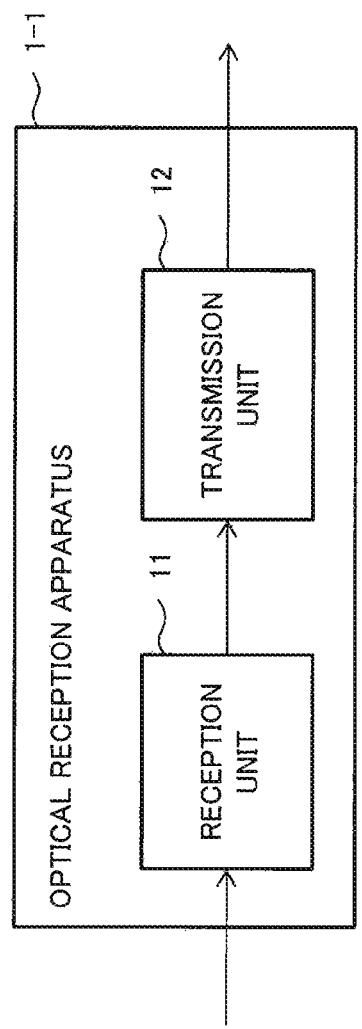
FIG. 2 is a figure illustrating an example of a configuration of the optical reception apparatus according to the first exemplary embodiment of the present invention.

FIG. 2 is a figure illustrating an example of a configuration of an optical reception apparatus 1-1. The optical reception apparatus 1-1 includes a reception unit 11 and a transmission unit 12.

The reception unit 11 receives the wavelength multiplexed signal light from the transmission path 20. Besides, the transmission unit 12 transfers an optical signal of a predetermined wavelength in the wavelength multiplexed signal light received by the reception unit 11 in accordance with an identifier included in the optical signal of the predetermined wavelength.

Figure 3:
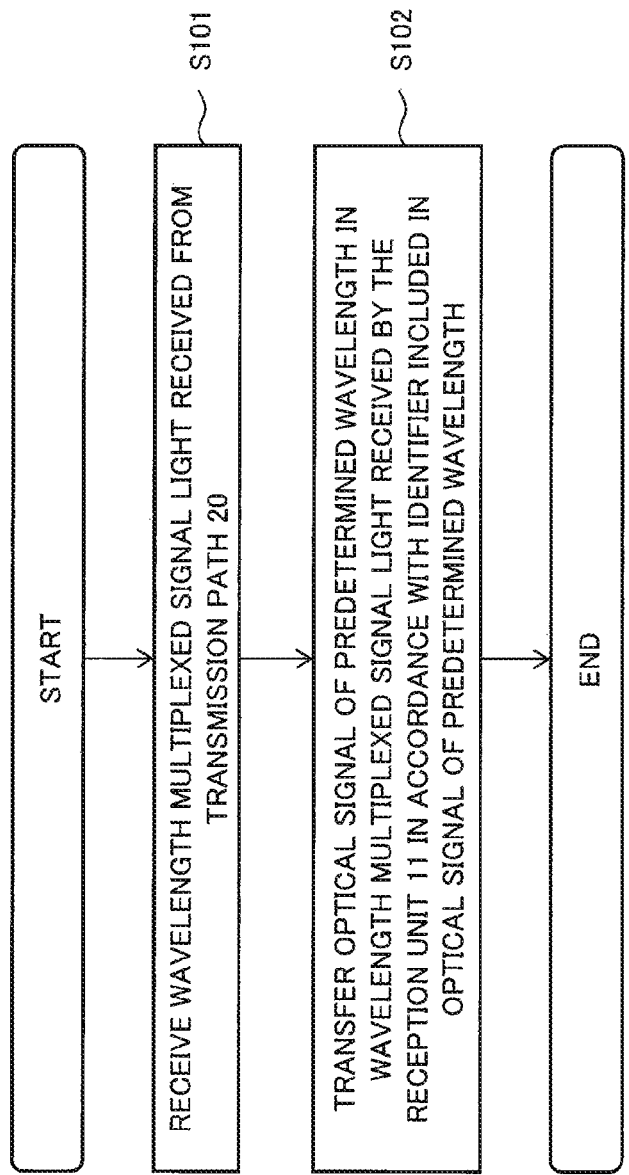
FIG. 3 is a flowchart illustrating an example of operation of the optical reception apparatus according to the first exemplary embodiment of the present invention.

FIG. 3 is a flowchart illustrating an example of operation of the optical reception apparatus 1-1 according to the first exemplary embodiment of the present invention.

The reception unit 11 receives the wavelength multiplexed signal light received from the transmission path 20 (S101).

The transmission unit 12 transfers an optical signal of a predetermined wavelength in the wavelength multiplexed signal light received by the reception unit 11 in accordance with an identifier included in the optical signal of the predetermined wavelength (S102).

As described above, the optical reception apparatus 1-1 of the first exemplary embodiment of the present invention transfers the optical signal of the predetermined wavelength in accordance with the identifier included in the optical signal of the predetermined wavelength, and therefore, in a case where the optical signal is not the apparatus of the intended transmission destination, the optical signal is not transferred to an apparatus in a subsequent stage. Accordingly, this can prevent the optical signal from being transferred to an apparatus that is not the intended transmission destination, and the confidentiality of the information included in the optical signal can be ensured.

Second Exemplary Embodiment

Overview of the second exemplary embodiment of the present invention will be explained with reference to drawings.

The example of a configuration of the optical communication system according to the second exemplary embodiment of the present invention is the same as that of FIG. 1.

Figure 4:
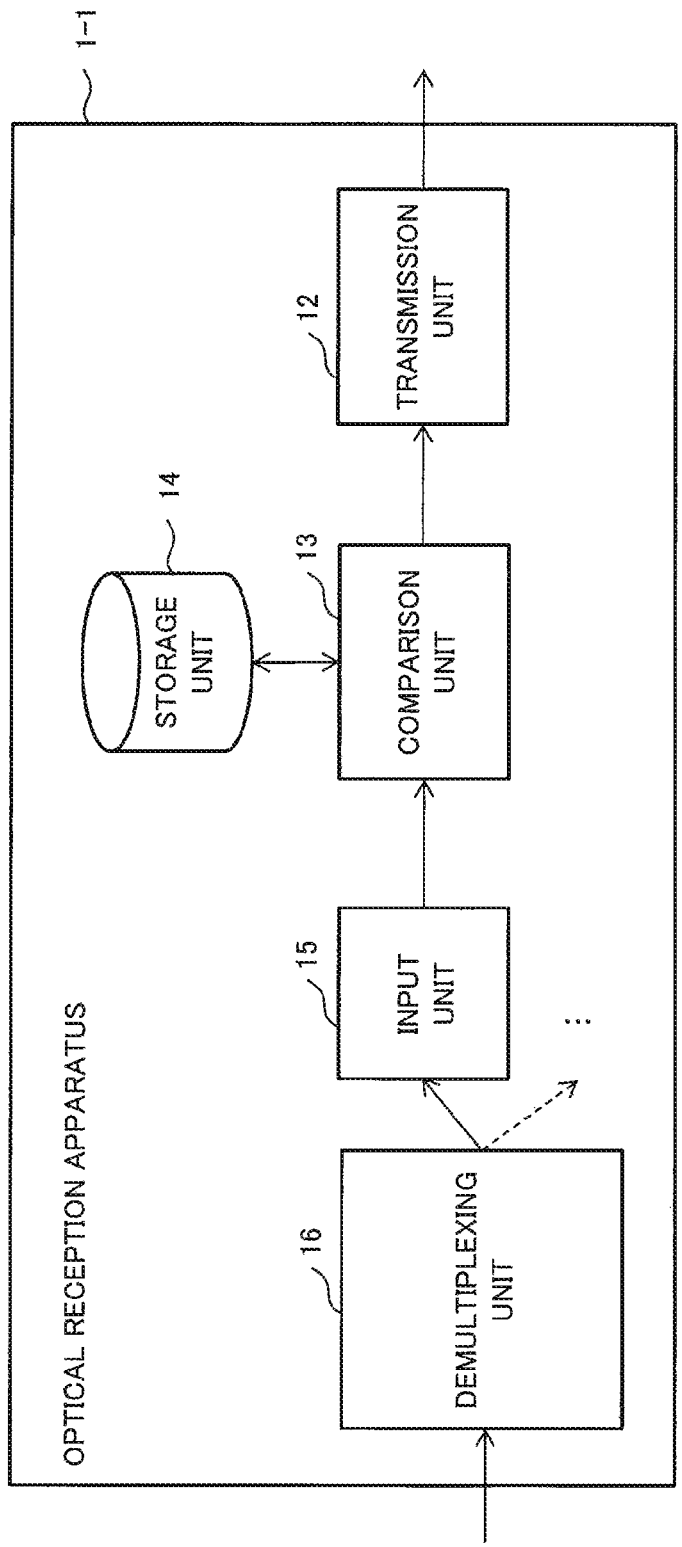
FIG. 4 is a figure illustrating an example of a configuration of an optical reception apparatus according to a second exemplary embodiment of the present invention.

FIG. 4 is a figure illustrating an example of a configuration of the optical reception apparatus 1-1. The configuration of optical reception apparatus 1-1 includes a transmission unit 12, a comparison unit 13, a storage unit 14, an input unit 15, and a demultiplexing unit 16.

The demultiplexing unit 16 demultiplexes the wavelength multiplexed signal light received from the transmission path 20, and outputs the optical signal of the predetermined wavelength according to the input unit 15 to the input unit 15.

The reception unit 15 converts the optical signal received from the demultiplexing unit 16 into an electric signal, and outputs the electric signal to the comparison unit 13.

The comparison unit 13 compares an identifier (comparison information) stored in the storage unit 14 in advance and an identifier included in the electric signal which is received from the reception unit 15. The comparison unit 13 outputs the electric signal to the transmission unit 12 in accordance with agreement between the identifier included in the electric signal and the comparison information. In contrast, the comparison unit 13 discards the electric signal in accordance with disagreement between the identifier included in the electric signal and the comparison information.

The storage unit 14 stores, in advance, the identifier of the optical transmission apparatus 1-2 with which communication is to be performed, as the comparison information.

The transmission unit 12 converts the electric signal received from the comparison unit 13 into an optical signal, and transfers the optical signal to the apparatus in a subsequent stage.

Figure 5:
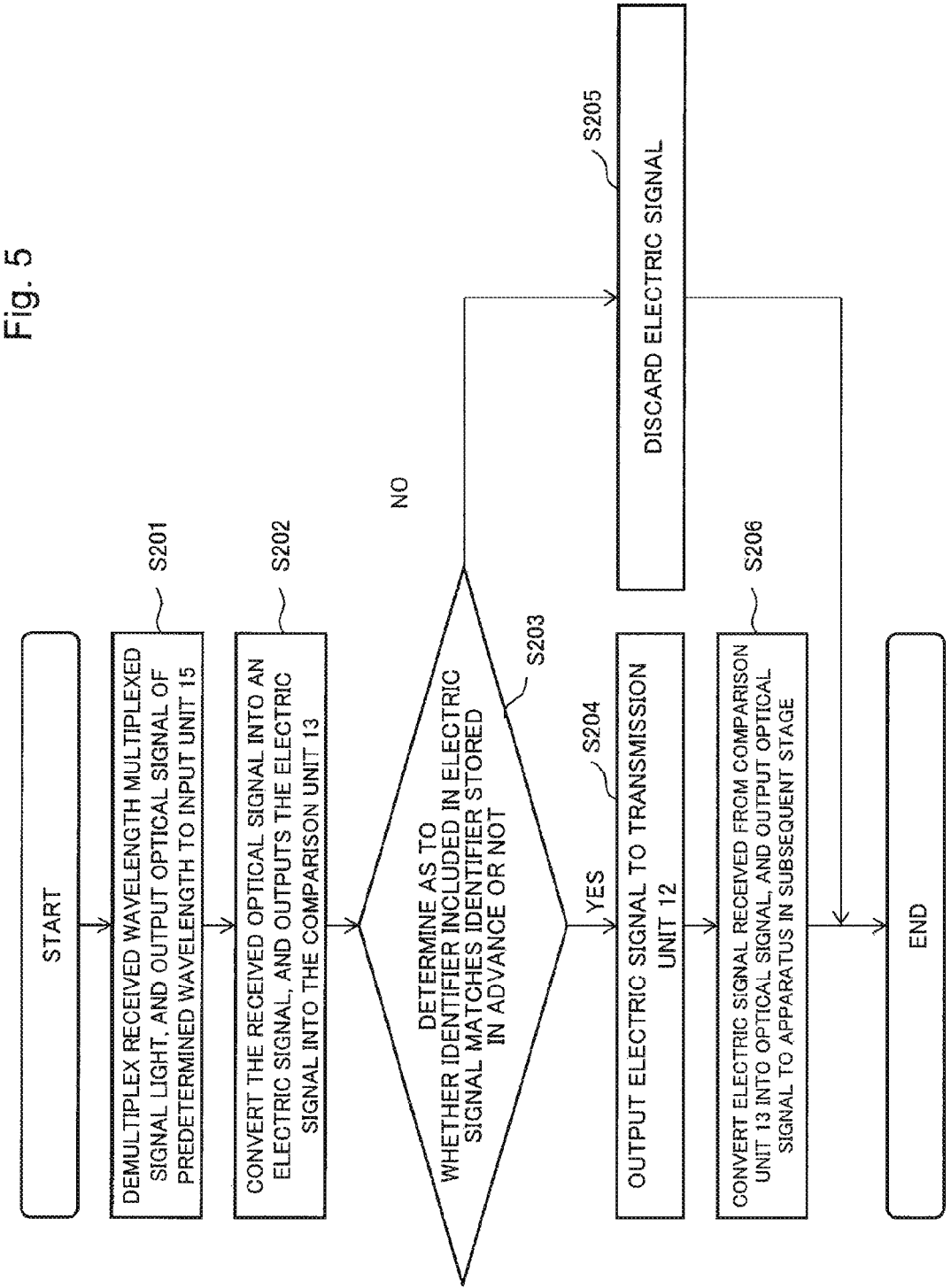
FIG. 5 is a flowchart illustrating an example of operation of the optical reception apparatus according to the second exemplary embodiment of the present invention.

FIG. 5 is a flowchart illustrating an example of operation of the optical reception apparatus 1-1 according to the second exemplary embodiment of the present invention.

The demultiplexing unit 16 demultiplexes the received wavelength multiplexed signal light, and outputs the optical signal of the predetermined wavelength according to the input unit 15 to the input unit 15 (S201).

The input unit 15 converts the received optical signal into an electric signal, and outputs the electric signal into the comparison unit 13 (S202).

The comparison unit 13 compares the identifier (comparison information) stored in the storage unit 14 in advance and the identifier included in the electric signal received from the reception unit 15, and outputs the electric signal to the transmission unit 12 (S204) in accordance with agreement between both of the identifiers (YES in S203). In contrast, the comparison unit 13 discards the electric signal (S205) in accordance with disagreement between both of the identifiers (NO in S203).

The transmission unit 12 converts the electric signal received from the comparison unit 13 into the optical signal, and outputs the optical signal to the apparatus in a subsequent stage (S206).

Figure 6:
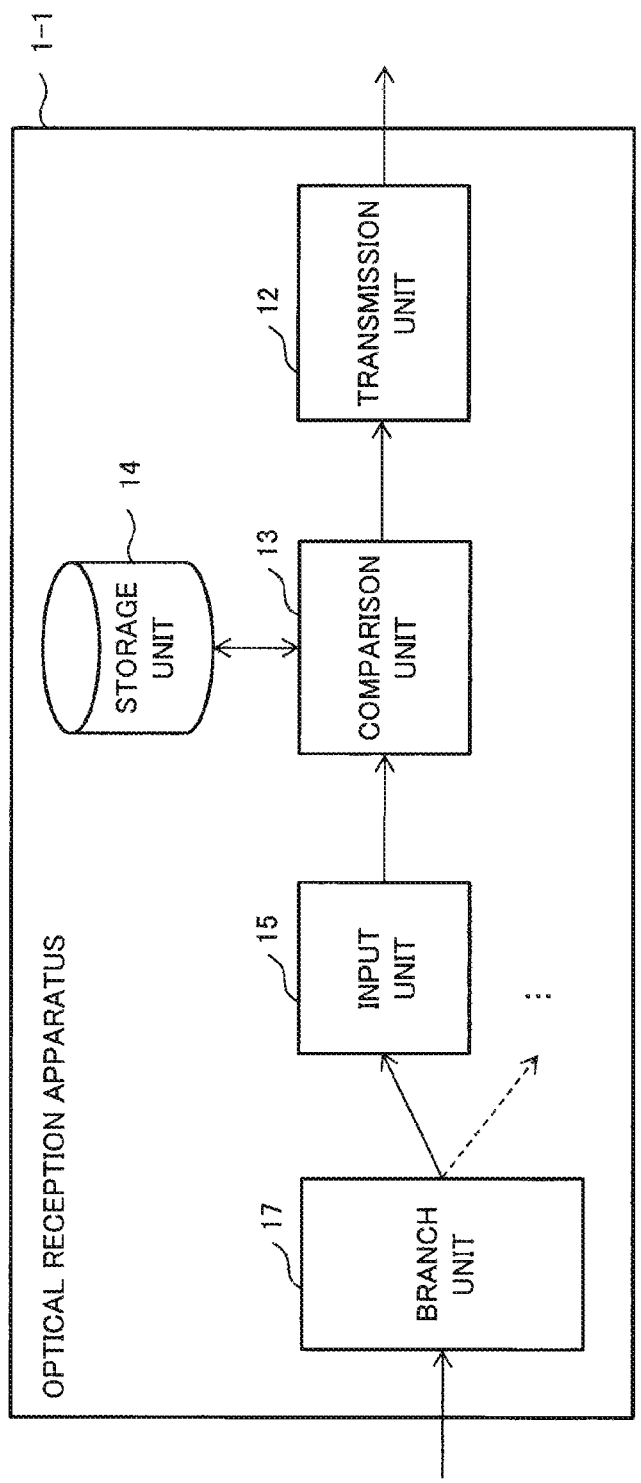
FIG. 6 is a figure illustrating another example of a configuration of the optical reception apparatus according to the second exemplary embodiment of the present invention.

FIG. 6 is a figure illustrating another example of a configuration of the optical reception apparatus 1-1. The optical reception apparatus 1-1 has a branch unit 17 in place of the demultiplexing unit 16.

The branch unit 17 branches the wavelength multiplexed signal light received from the transmission path 20, and outputs the wavelength multiplexed signal light to the input unit 15.

The input unit 15 selectively receives only the optical signal of the predetermined wavelength in the received wavelength multiplexed signal light, converts the optical signal into an electric signal, and outputs the electric signal to the comparison unit 13. In this case, the means for selectively receiving only the optical signal of the predetermined wavelength is, for example, means for receiving the light by causing the light of the wavelength, which is to be received, to interfere with the wavelength multiplexed signal light, such as, e.g., digital coherent reception.

Figure 7:
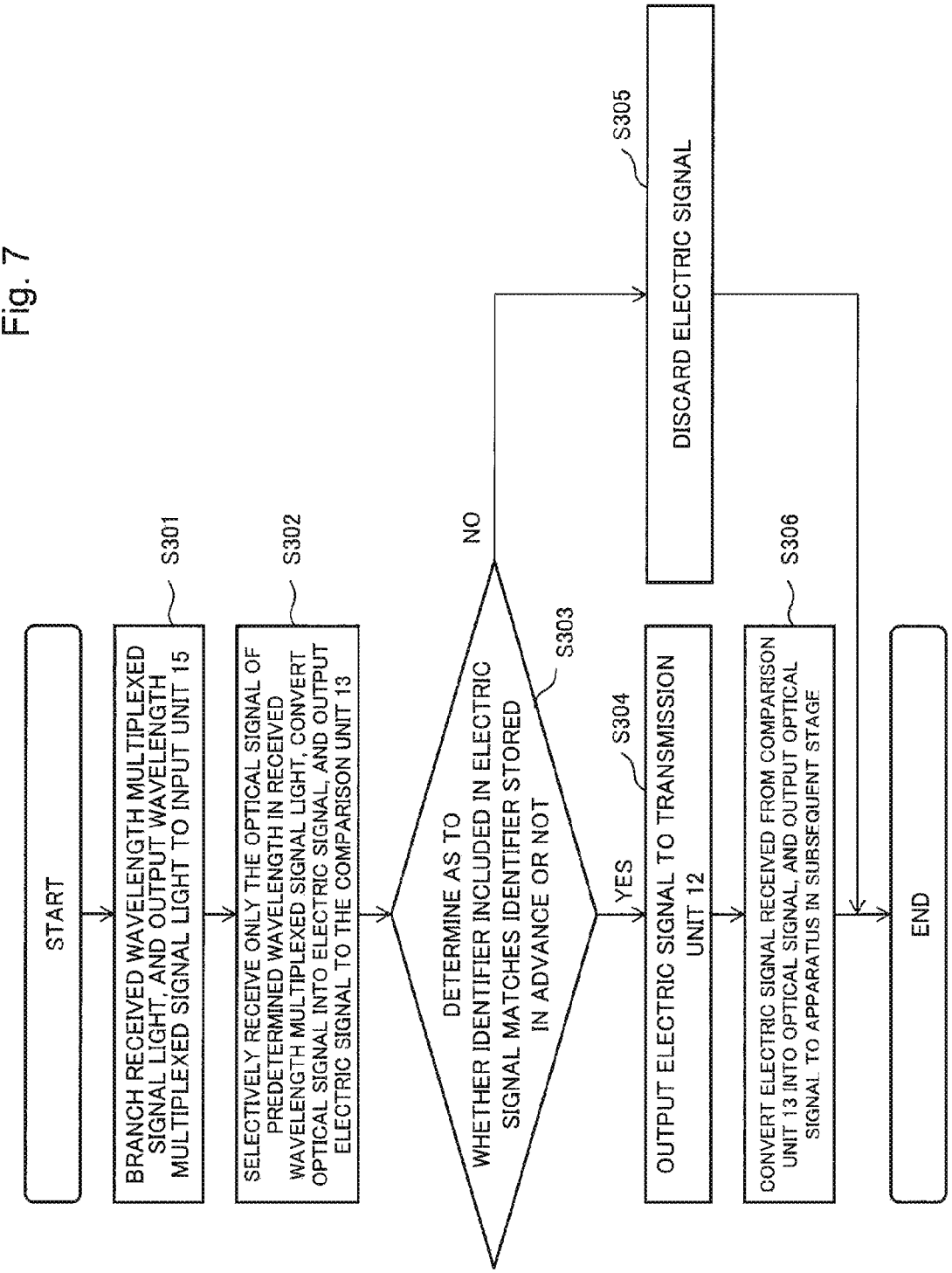
FIG. 7 is a flowchart illustrating another example of operation of the optical reception apparatus according to the second exemplary embodiment of the present invention.

FIG. 7 is a flowchart illustrating another example of operation of the optical reception apparatus 1-1 according to the second exemplary embodiment of the present invention.

The branch unit 17 branches the received wavelength multiplexed signal light, and outputs the wavelength multiplexed signal light to the input unit 15 (S301).

The input unit 15 selectively receives only the optical signal of the predetermined wavelength in the received wavelength multiplexed signal light, converts the optical signal into an electric signal, and outputs the electric signal to the comparison unit 13 (S302).

It should be noted that, in FIG. 7, the processing in step 303 (S303) to step 306 (S306) is the same processing as the processing in step 203 (S203) to step 206 (S206) of FIG. 5.

As described above, the optical reception apparatus 1-1 according to the second exemplary embodiment of the present invention compares the identifier included in the optical signal of the predetermined wavelength and the identifier (comparison information) stored in the storage unit 14, and in a case where the identifiers of them both match each other, the optical reception apparatus 1-1 transfers the optical signal, and in a case where the identifiers of them both do not match each other, the optical reception apparatus 1-1 discards the optical signal in question. Therefore, in a case where the transmission destination of the optical signal is not the apparatus of the intended transmission destination, the optical reception apparatus 1-1 does not transfer the optical signal to the apparatus in a subsequent stage. Hence, this can prevent the optical signal from being transferred to an apparatus that is not the intended transmission destination, and the confidentiality of the information included in the optical signal can be ensured.

Third Exemplary Embodiment

Overview of the third exemplary embodiment of the present invention will be explained with reference to drawings.

Figure 8:
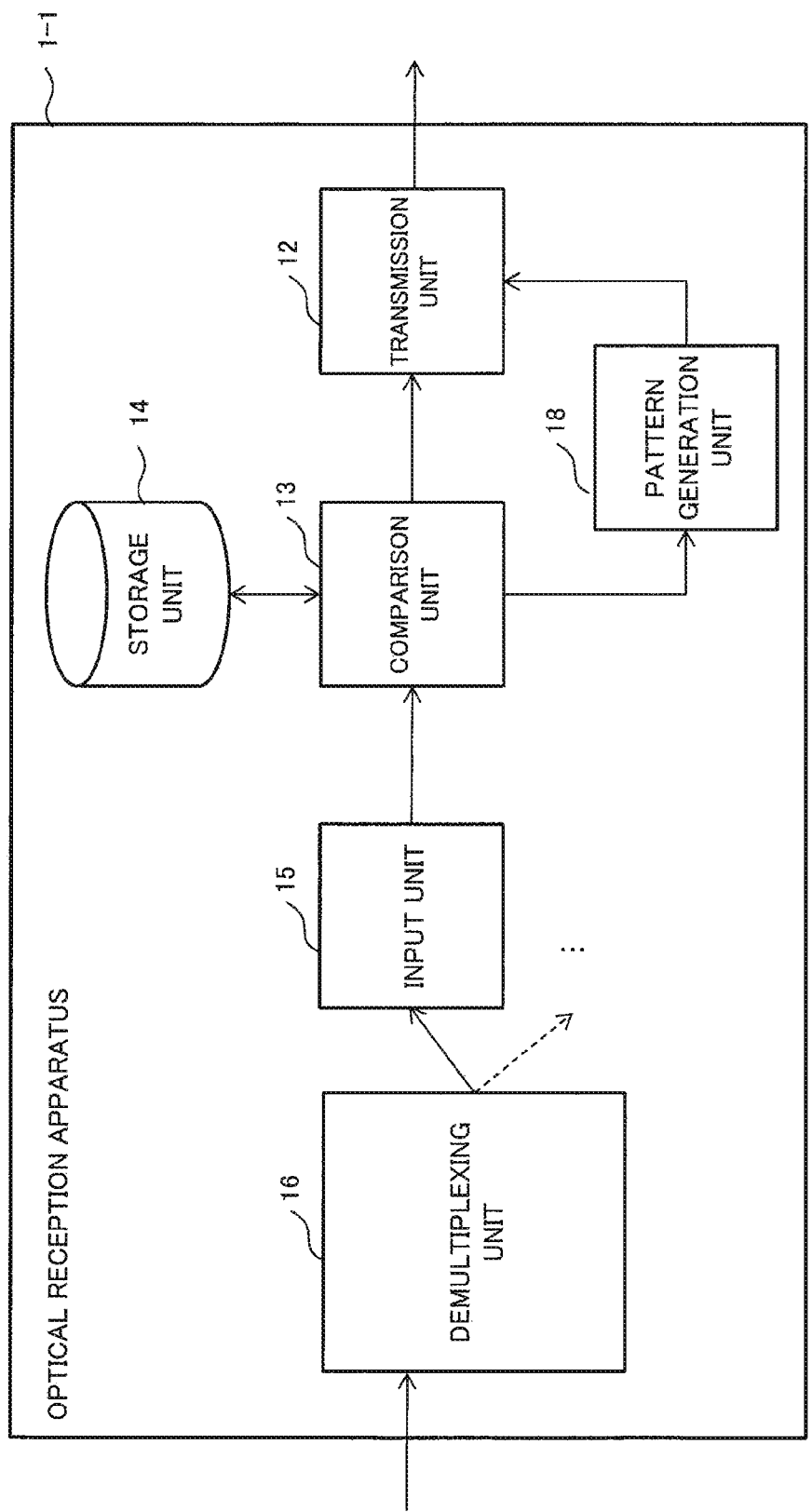
FIG. 8 is a figure illustrating another example of a configuration of an optical reception apparatus according to a third exemplary embodiment of the present invention.

FIG. 8 is a figure illustrating an example of a configuration of the optical reception apparatus 1-1. The optical reception apparatus 1-1 includes a transmission unit 12, a comparison unit 13, a storage unit 14, an input unit 15, a demultiplexing unit 16, and a pattern generation unit 18. It should be noted that the optical reception apparatus 1-1 may be the branch unit 17 in place of the demultiplexing unit 16, but in the following explanation, a case where the optical reception apparatus 1-1 is the demultiplexing unit 16 will be explained as an example.

The comparison unit 13 compares the identifier (comparison information) stored in advance in the storage unit 14 and the identifier included in the electric signal received from the input unit 15.

Further, in a case where the identifier included in the electric signal and the comparison information match each other, the comparison unit 13 outputs the electric signal to the transmission unit 12. In contrast, in a case where the identifier included in the electric signal and the comparison information do not match each other, the comparison unit 13 outputs a notification signal including information indicating disagreement to the pattern generation unit 18.

In a case where the pattern generation unit 18 receives the notification signal from the comparison unit 13, the pattern generation unit 18 generates an electric signal including a dummy pattern in which 0 and 1 are randomly arranged or a fixed pattern in which 0 and 1 are arranged in a particular pattern, and outputs the electric signal thus generated to the transmission unit 12.

In a case where the transmission unit 12 receives the electric signal from the comparison unit 13, the transmission unit 12 converts the electric signal received from the comparison unit 13 into an optical signal, and outputs the optical signal to the apparatus in a subsequent stage. In contrast, in a case where the transmission unit 12 receives an electric signal including a dummy pattern or a fixed pattern from the pattern generation unit 18, the transmission unit 12 converts, into an optical signal, the electric signal including the dummy pattern or the fixed pattern received from the pattern generation unit 18, and outputs the optical signal to the apparatus in a subsequent stage.

Here, in this case, instead of the generation of the dummy pattern and the fixed pattern, the pattern generation unit 18 may serve as a scrambler to randomly interchange the bit string of the electric signal received from the comparison unit 13 to the transmission unit 12.

Figure 9:
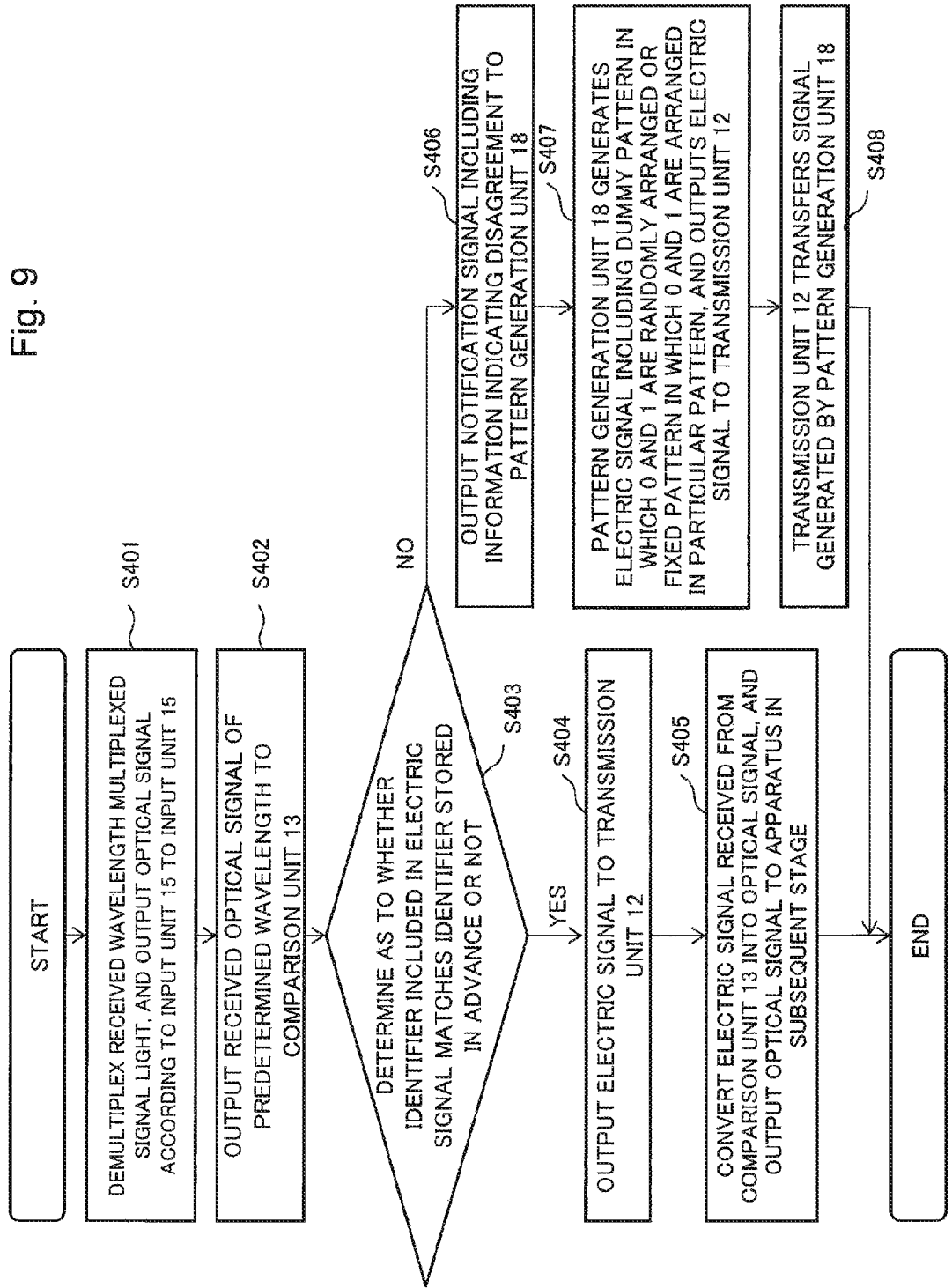
FIG. 9 is a flowchart illustrating another example of operation of the optical reception apparatus according to the third exemplary embodiment of the present invention.

FIG. 9 is a flowchart illustrating another example of operation of the optical reception apparatus 1-1 according to the third exemplary embodiment of the present invention.

The demultiplexing unit 16 demultiplexes the received wavelength multiplexed signal light, and outputs the optical signal according to the input unit 15 to the input unit 15 (S401).

The input unit 15 converts the received optical signal into an electric signal, and outputs the electric signal to the comparison unit 13 (S402).

The comparison unit 13 compares the identifier (comparison information) stored in advance in the storage unit 14 and the identifier included in the electric signal received from the reception unit 15, and in a case where the identifier included in the electric signal and the comparison information match each other (YES in S403), the comparison unit 13 outputs the electric signal to the transmission unit 12 (S404). The transmission unit 12 converts the electric signal received from the comparison unit 13 into an optical signal, and outputs the optical signal to the apparatus in a subsequent stage (S405).

In contrast, in a case where the identifier included in the electric signal and the comparison information do not match each other (NO in S403), the comparison unit 13 outputs the notification signal including the information indicating disagreement to the pattern generation unit 18 (S406). In a case where the pattern generation unit 18 receives the notification signal from the comparison unit 13, the pattern generation unit 18 generates an electric signal including a dummy pattern in which 0 and 1 are randomly arranged or a fixed pattern in which 0 and 1 are arranged in a particular pattern, and outputs the electric signal to the transmission unit 12 (S407). In a case where the transmission unit 12 receives the electric signal, the transmission unit 12 converts the electric signal received from the comparison unit 13 into an optical signal, and outputs the optical signal to the apparatus in a subsequent stage (S408).

As described above, in a case where the comparison result of the comparison unit 13 indicates disagreement, the optical reception apparatus 1-1 of the third exemplary embodiment of the present invention outputs, instead of the received optical signal, an optical signal obtained by randomly interchanging the dummy pattern, the fixed pattern, or the bit string to the apparatus in a subsequent stage. Therefore, this can prevent the optical signal from being transferred to an apparatus that is not the intended transmission destination, and the confidentiality of the information included in the optical signal can be ensured.

Fourth Exemplary Embodiment

The fourth exemplary embodiment of the present invention will be explained with reference to drawings.

Figure 10:
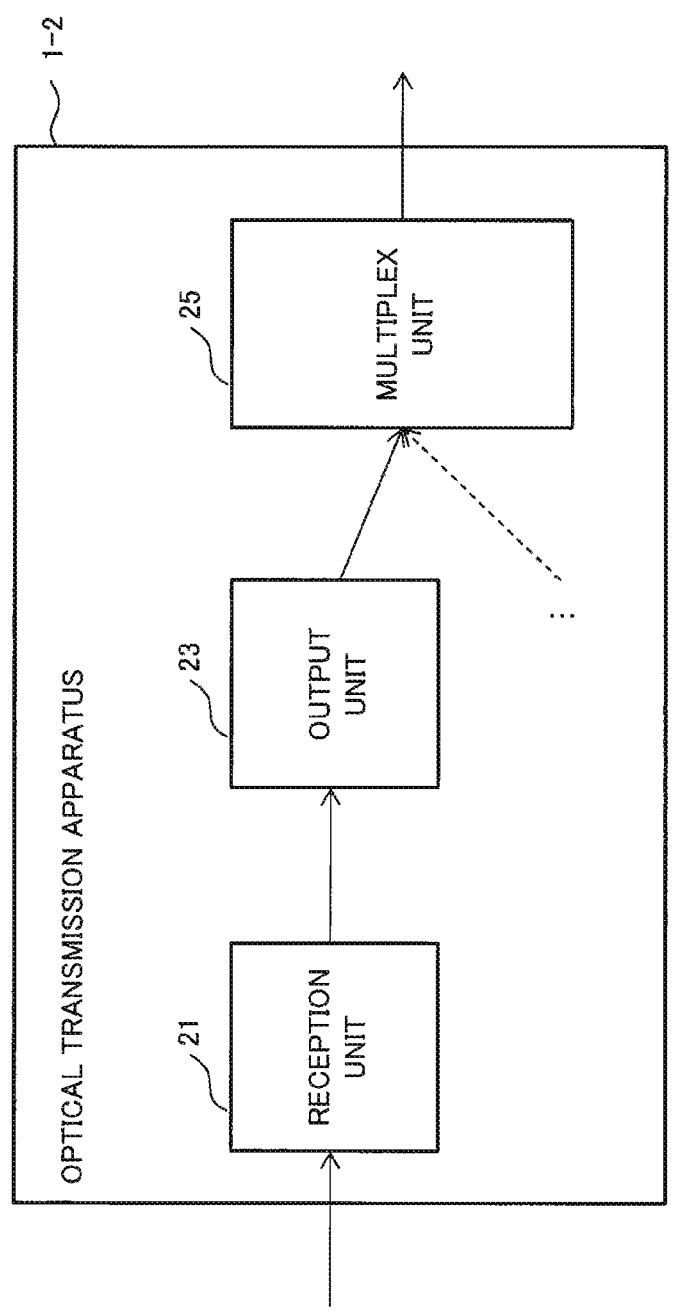
FIG. 10 is a figure illustrating an example of a configuration of an optical transmission apparatus according to a fourth exemplary embodiment of the present invention.

FIG. 10 is a figure illustrating an example of a configuration of the optical transmission apparatus 1-2. The optical transmission apparatus 1-2 includes a reception unit 21, an output unit 23, and a multiplex unit 25.

The reception unit 21 receives an optical signal of a predetermined wavelength. Besides, the output unit 23 incorporates an identifier uniquely identifying the optical transmission apparatus 1-2 into the optical signal of the predetermined wavelength received by the reception unit 21, and transmits the optical signal. It should be noted that the identifier may be an identifier uniquely identifying the output unit 23. Further, the multiplex unit 25 multiplexes the optical signal including the identifier and an optical signal of a wavelength different from the optical signal received by the reception unit 21, and outputs the multiplexed optical signal to the transmission path 20.

Figure 11:
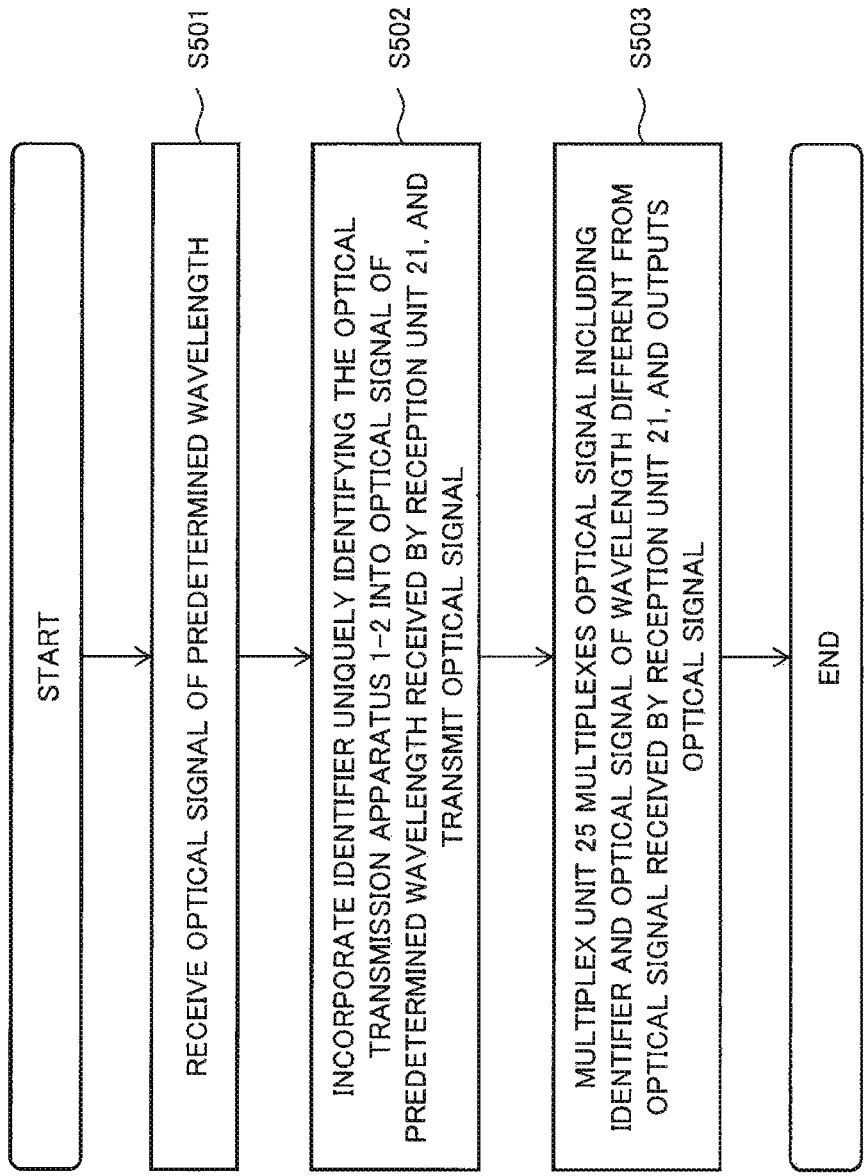
FIG. 11 is a flowchart illustrating an example of operation of the optical transmission apparatus according to the fourth exemplary embodiment of the present invention.

FIG. 11 is a flowchart illustrating an example of operation of the optical transmission apparatus 1-2 according to the fourth exemplary embodiment of the present invention.

The reception unit 21 receives the optical signal of the predetermined wavelength (S501).

The output unit 23 incorporates an identifier uniquely identifying the optical transmission apparatus 1-2 into the optical signal of the predetermined wavelength received by the reception unit 21, and transmits the optical signal (S502). Then, the multiplex unit 25 multiplexes the optical signal including the identifier and an optical signal of a wavelength different from the optical signal received by the reception unit 21, and outputs the optical signal (S503).

As described above, the optical transmission apparatus 1-2 according to the fourth exemplary embodiment of the present invention incorporates the identifier uniquely identifying the optical transmission apparatus 1-2 (or output unit 23) into the optical signal, which is to be transmitted, and transmits the optical signal. Therefore, the optical reception apparatus 1-1 receiving the transmitted optical signal can determine whether to transfer the optical signal of the predetermined wavelength or not in accordance with the identifier included in the optical signal, and this can prevent the optical signal from being transferred to an apparatus that is not the intended transmission destination.

Fifth Exemplary Embodiment

Overview of the fifth exemplary embodiment of the present invention will be explained with reference to drawings.

Figure 12:
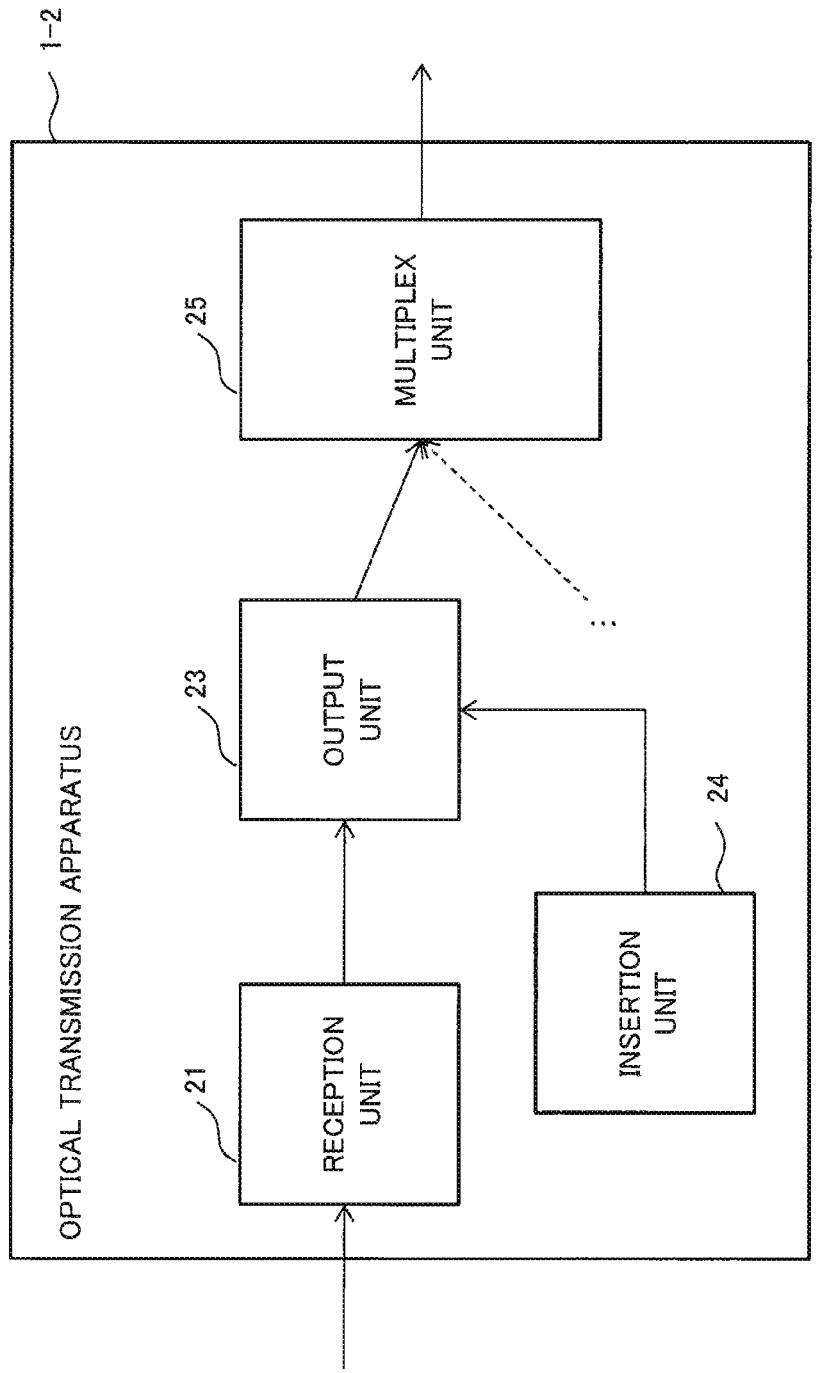
FIG. 12 is a figure illustrating an example of a configuration of an optical transmission apparatus according to the fifth exemplary embodiment of the present invention.

FIG. 12 is a figure illustrating an example of a configuration of the optical transmission apparatus 1-2. The optical transmission apparatus 1-2 includes a reception unit 21, an output unit 23, an insertion unit 24, and a multiplex unit 25.

The output unit 23 incorporates the identifier notified by the insertion unit 24 into the optical signal of the predetermined wavelength received by the reception unit 21, and outputs the optical signal to the multiplex unit 25.

The insertion unit 24 notifies the output unit 23 of the identifier uniquely identifying the optical transmission apparatus 1-2. It should be noted that the identifier may also be the identifier uniquely identifying the output unit 23.

The multiplex unit 25 transmits the optical signal received from the output unit 23 to the transmission path 20. It should be noted that the multiplex unit 25 multiplexes the optical signals of wavelengths different from each other received from multiple output units 23, and transmits the multiplexed optical signal as the wavelength multiplexed signal light.

Figure 13:
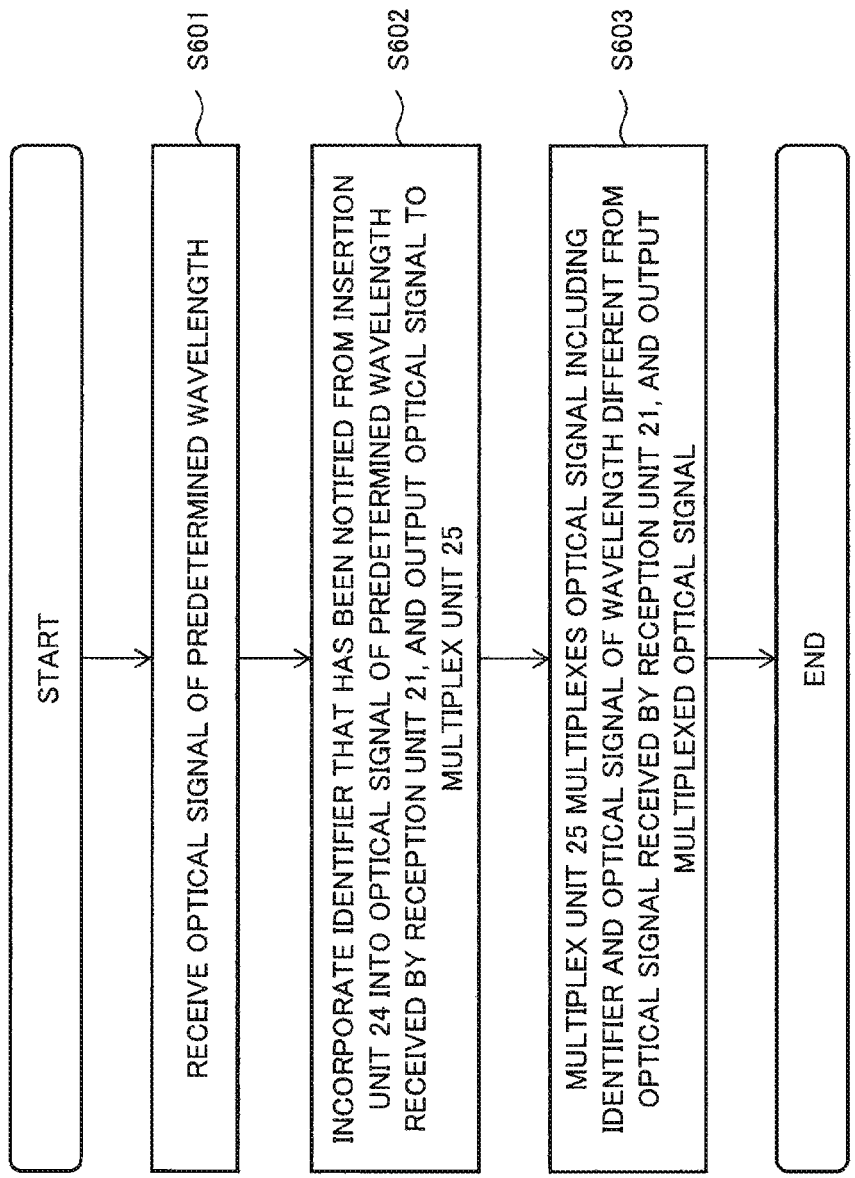
FIG. 13 is a flowchart illustrating an example of operation of the optical transmission apparatus according to the fifth exemplary embodiment of the present invention.

FIG. 13 is a flowchart illustrating an example of operation of the optical transmission apparatus 1-2 according to the fifth exemplary embodiment of the present invention.

The reception unit 21 receives the optical signal of the predetermined wavelength (S601).

The output unit 23 incorporates the identifier that has been notified from the insertion unit 24 into the optical signal of the predetermined wavelength received by the reception unit 21, and outputs the optical signal to the multiplex unit 25 (S602).

The multiplex unit 25 multiplexes the optical signal including the identifier and an optical signal of a wavelength different from the optical signal received by the reception unit 21, and outputs the multiplexed optical signal (S603).

As described above, the optical transmission apparatus 1-2 according to the fifth exemplary embodiment of the present invention incorporates the identifier that has been notified from the insertion unit 24 into the optical signal which is to be transmitted, and transmits the optical signal. Therefore, the optical reception apparatus 1-1 receiving the transmitted optical signal can determine whether to transfer the optical signal of the predetermined wavelength in accordance with the identifier included in the optical signal, and this can prevent the optical signal from being transferred to an apparatus that is not the intended transmission destination.

Sixth Exemplary Embodiment

The sixth exemplary embodiment of the present invention will be explained with reference to drawings.

Figure 14:
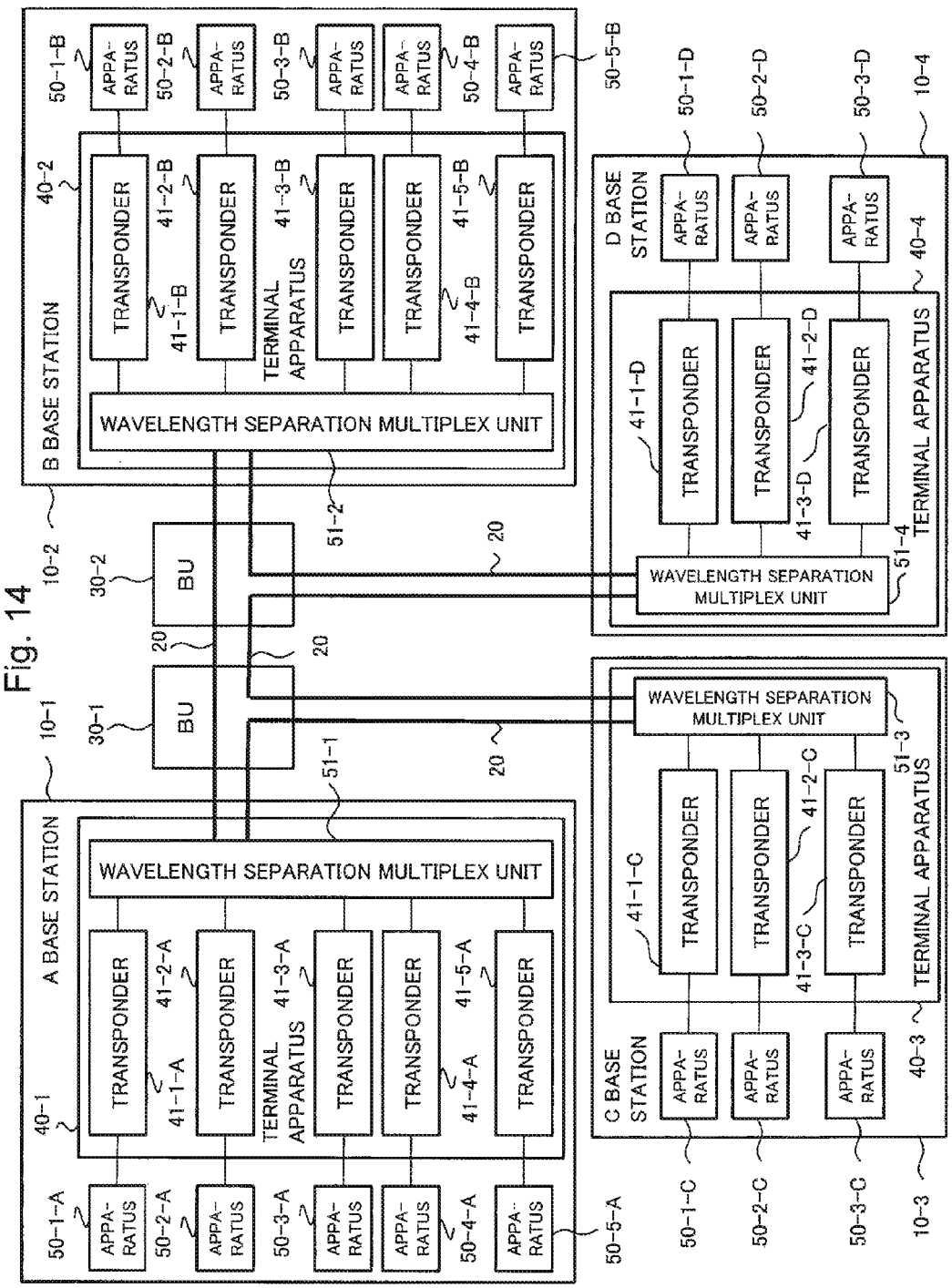
FIG. 14 is a figure illustrating an example of a configuration of an optical communication system according to a sixth exemplary embodiment of the present invention.

FIG. 14 is a figure illustrating an example of a configuration of a communication system according to the sixth exemplary embodiment of the present invention.

As shown in FIG. 14, the communication system according to the sixth exemplary embodiment of the present invention includes an A base station 10-1, a B base station 10-2, a C base station 10-3, and a D base station 10-4 (hereinafter referred to as a "base station 10" in a case where it is not particularly necessary to distinguish them from each other).

Each of the base stations 10 is connected with an adjacent base station 10 via the transmission path 20. Further, the base stations 10 are connected with each other via a BU (optical branch apparatus) 30.

The transmission path 20 is constituted by bundling multiple optical fibers.

The BU 30 is an OADM-BU, and inserts or branches (Add/Drop) an optical signal of a predetermined wavelength in the wavelength multiplexed optical signal transmitted through the transmission path 20.

Figure 15:
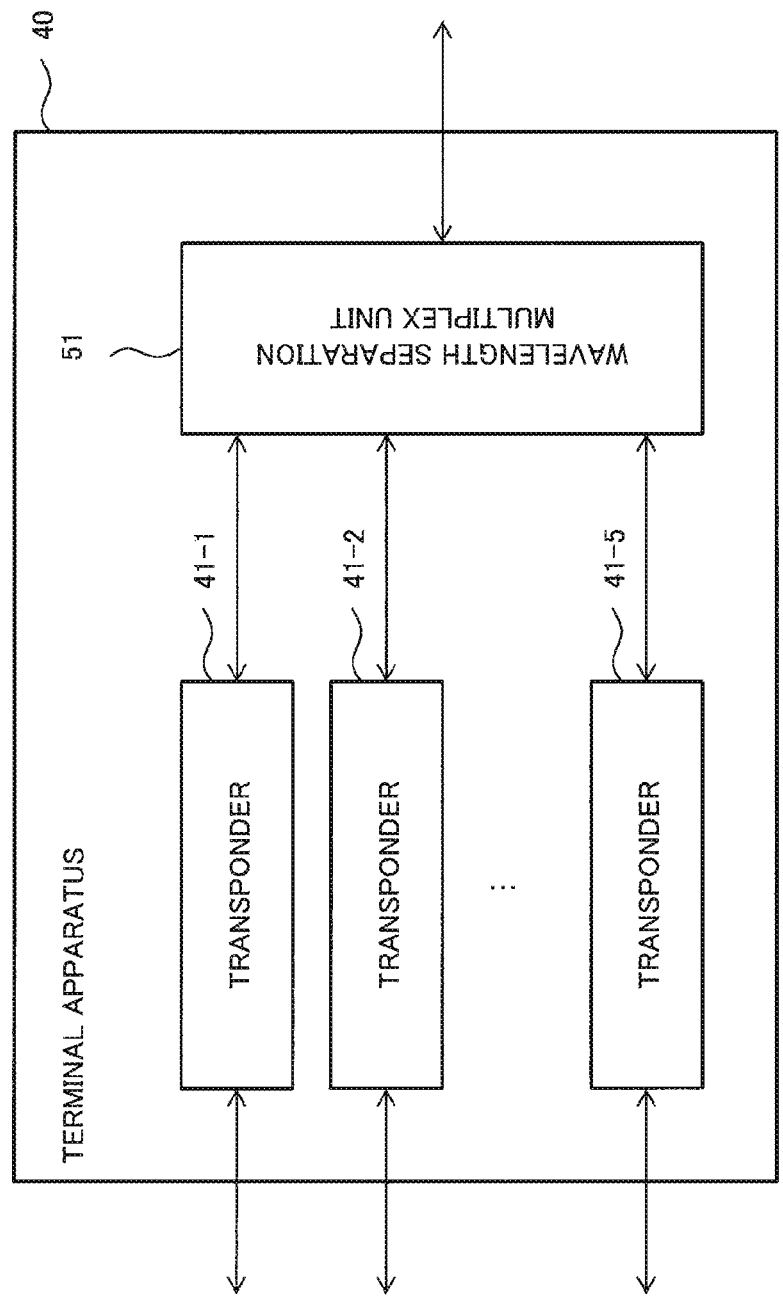
FIG. 15 is a figure illustrating an example of a configuration of the terminal apparatus according to the sixth exemplary embodiment of the present invention.

FIG. 15 is a figure illustrating an example of a configuration of the terminal apparatus 40 according to the sixth exemplary embodiment of the present invention.

As shown in FIG. 14, the base station 10 includes a terminal apparatus 40 and a client apparatus 50. The terminal apparatus 40 of the base station 10 includes transponders (Transponders) 41-1 to 41-5 (hereinafter referred to as a "transponder 41" in a case where it is not particularly necessary to distinguish from each other) and a wavelength separation multiplex unit 51.

The wavelength separation multiplex unit 51 performs wavelength multiplexing to multiplex multiple optical signals received from multiple client apparatuses 50, and transmits the multiplexed signal as a WDM signal. Further, the wavelength separation multiplex unit 51 demultiplexes a WDM signal from an opposed base station 10, and outputs the signal of each wavelength (wavelength band) to the transponder 41.

The transponder 41 performs predetermined processing on the optical signal received from the client apparatus 50, and outputs the processed optical signal to the wavelength separation multiplex unit 51. Further, the transponder 41 transmits the optical signal received from the wavelength separation multiplex unit 51 to the client apparatus 50 on the basis of the predetermined condition.

Figure 16:
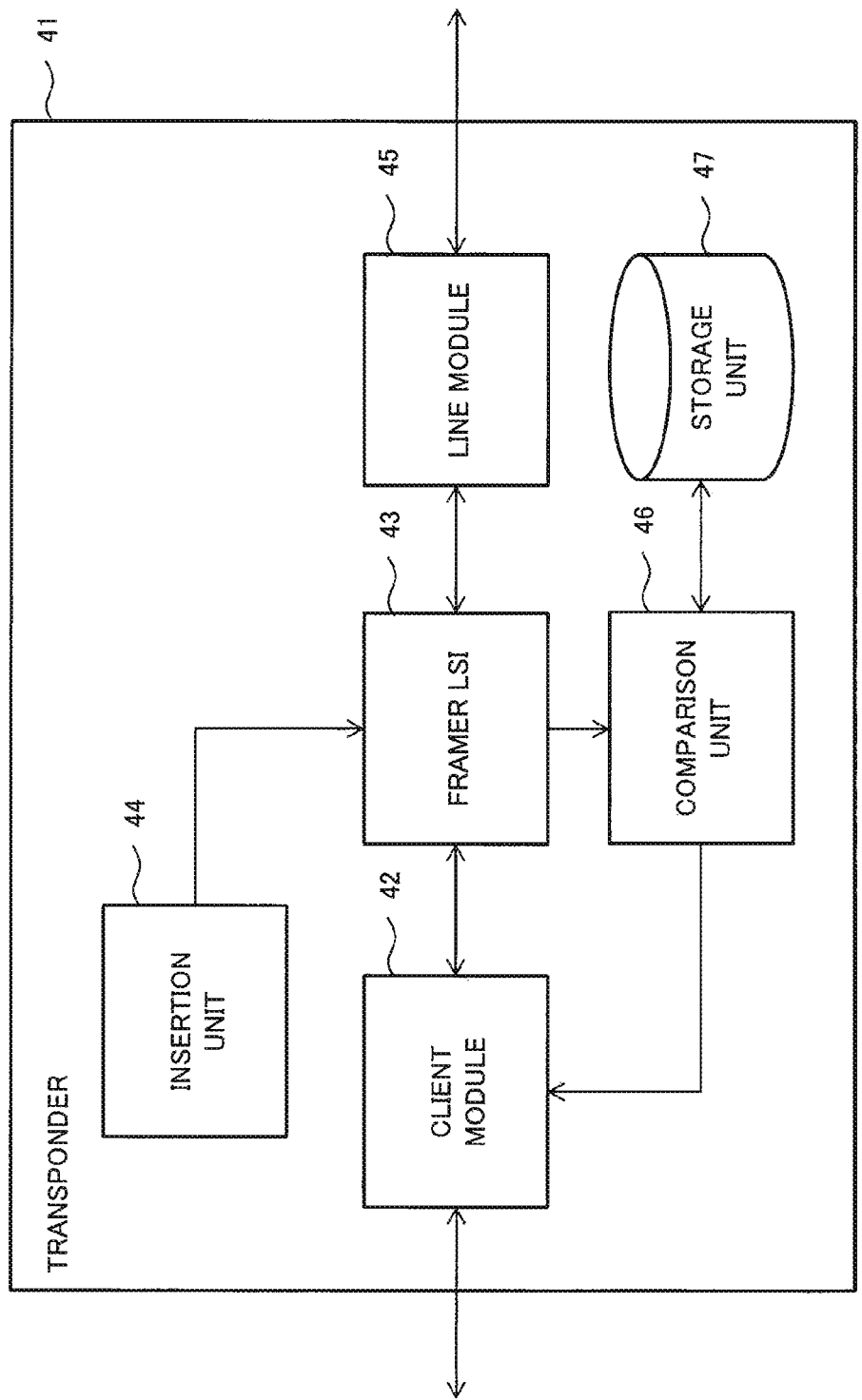
FIG. 16 is a figure illustrating an example of a configuration of a transponder according to the sixth exemplary embodiment of the present invention.

FIG. 16 is a figure illustrating an example of a configuration of the transponder 41. As shown in FIG. 16, the transponder 41 includes a client module 42, a Framer LSI 43, an insertion unit 44, a line module 45, a comparison unit 46, and a storage unit 47.

First, the case where the transponder 41 transmits the optical signal will be explained.

The client module 42 converts the optical signal received from the client apparatus 50 into an electric signal, and outputs the electric signal, as a client reception signal, to the Framer LSI 43.

The Framer LSI 43 accommodates the client signal received from the client module 42 into a line signal frame, stores an identifier for uniquely identifying the transponder 41 obtained from the insertion unit 44, and outputs the line signal frame to the line module 45. The Framer LSI 43 stores, in a predetermined area of the header of the line signal frame, the MAC address and the IP address of the transponder 43 as the identifier.

The insertion unit 44 notifies an identifier uniquely identifying the transponder 41 to the Framer LSI 43. In response to a request from the Framer LSI 43, the insertion unit 44 notifies the identifier.

The line module 45 converts the electric signal which is output by the Framer LSI 43 (i.e., line signal frame) into the optical signal of the predetermined wavelength, and outputs the optical signal to the wavelength separation multiplex unit 51.

Subsequently, a case where the transponder 41 receives the optical signal will be explained.

The line module 45 converts the line reception signal (optical signal) received from the wavelength separation multiplex unit 51 into an electric signal, and outputs the electric signal into the Framer LSI 43.

The Framer LSI 43 extracts a client signal from the line signal frame received from the line module 45, and outputs the client signal to the client module 42 as an electric signal. Further, the Framer LSI 43 extracts the identifier stored in the predetermined area of the header of the line signal frame, and notifies the extracted identifier to the comparison unit 46.

The comparison unit 46 refers to the storage unit 47 and determines whether the identifier that has been notified from the Framer LSI 43 and the stored identifier (comparison information) match each other or not. More specifically, the comparison unit 46 determines whether the optical signal (line signal frame) received by the transponder 41 is an optical signal transmitted from an apparatus with which the apparatus in question is to communicate (the transponder 41 which is set as the apparatus with which the apparatus in question is to communicate) or not. The comparison unit 46 notifies the determination result (notification signal including information indicating agreement or disagreement) to the client module 42.

The storage unit 47 stores, as the comparison information, the identifier of the transponder 41 with which the apparatus in question is to communicate. In the sixth exemplary embodiment of the present invention, a set of transponders 41 communicating with each other is set in advance, and the transponders 41 communicate with each other by using a predetermined wavelength. FIG. 17 is a table illustrating a connection relationship of transponders 41 of each base station 10 in the communication system as shown in FIG. 14 and the used wavelength. Likewise, FIG. 18 is a table illustrating transponders 41 provided in each of the base stations 10 in the communication system as shown in FIG. 14, and the identifier of the transponder 41, the identifier of a transponder 41 with which the transponder 41 in question communicates.

The client module 42 converts the electric signal received from the Framer LSI 43 into an optical signal, and transmits the optical signal, as a client signal, to the client apparatus 50. The client module 42 determines whether to transmit the client signal to the client apparatus 50 or not in accordance with a determination result received from the comparison unit 46. More specifically, if the client module 42 receives a determination result indicating agreement from the comparison unit 46 (notification signal including information indicating agreement), the client module 42 transmits the client signal to the client apparatus 50. In contrast, if the client module 42 receives a determination result indicating disagreement from the comparison unit 46 (notification signal including information indicating disagreement), the client module 42 discards the client signal.

Figure 19:
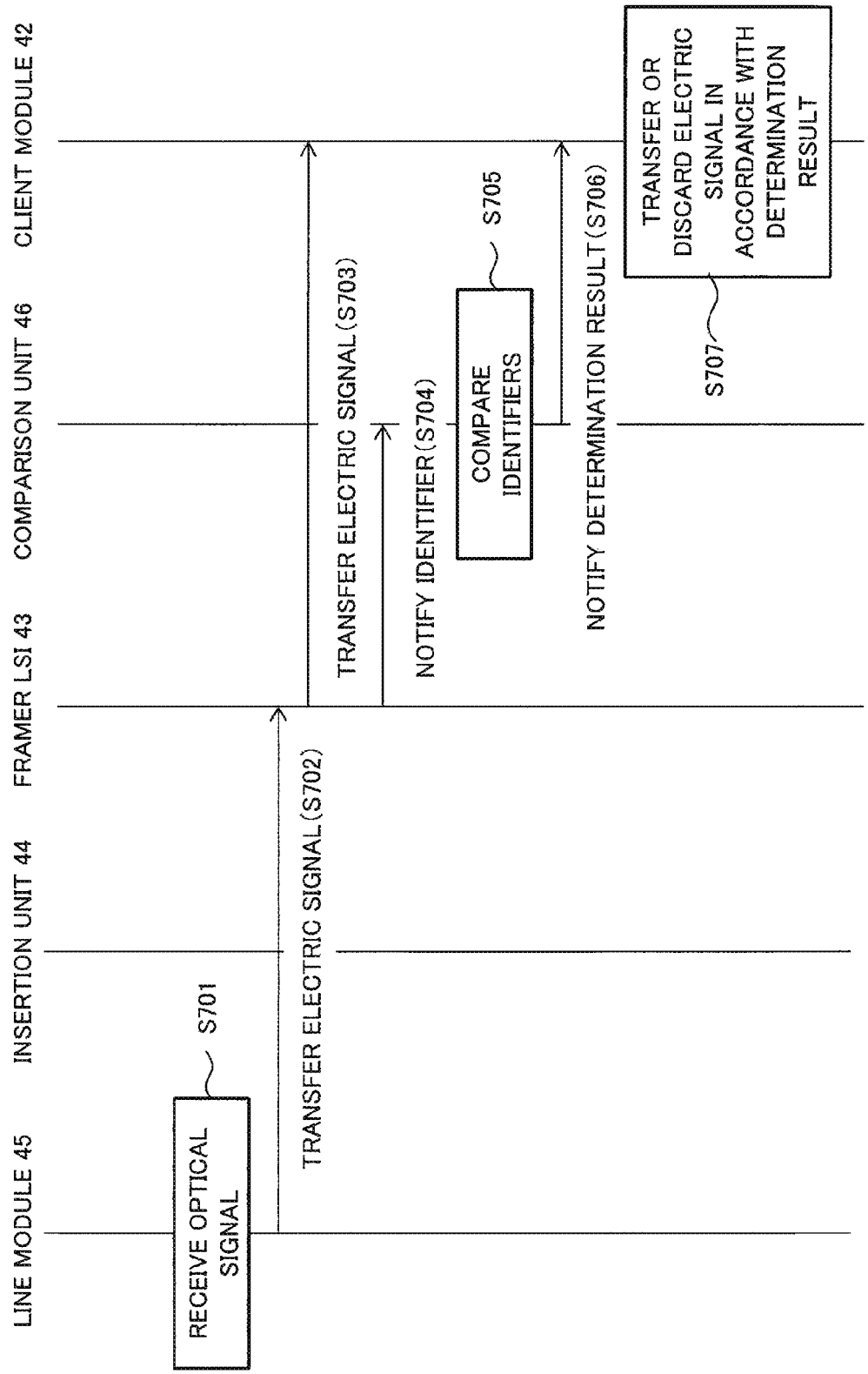
FIG. 19 is a sequence diagram illustrating an example of operation of the transponder according to the sixth exemplary embodiment of the present invention.
Figure 20:
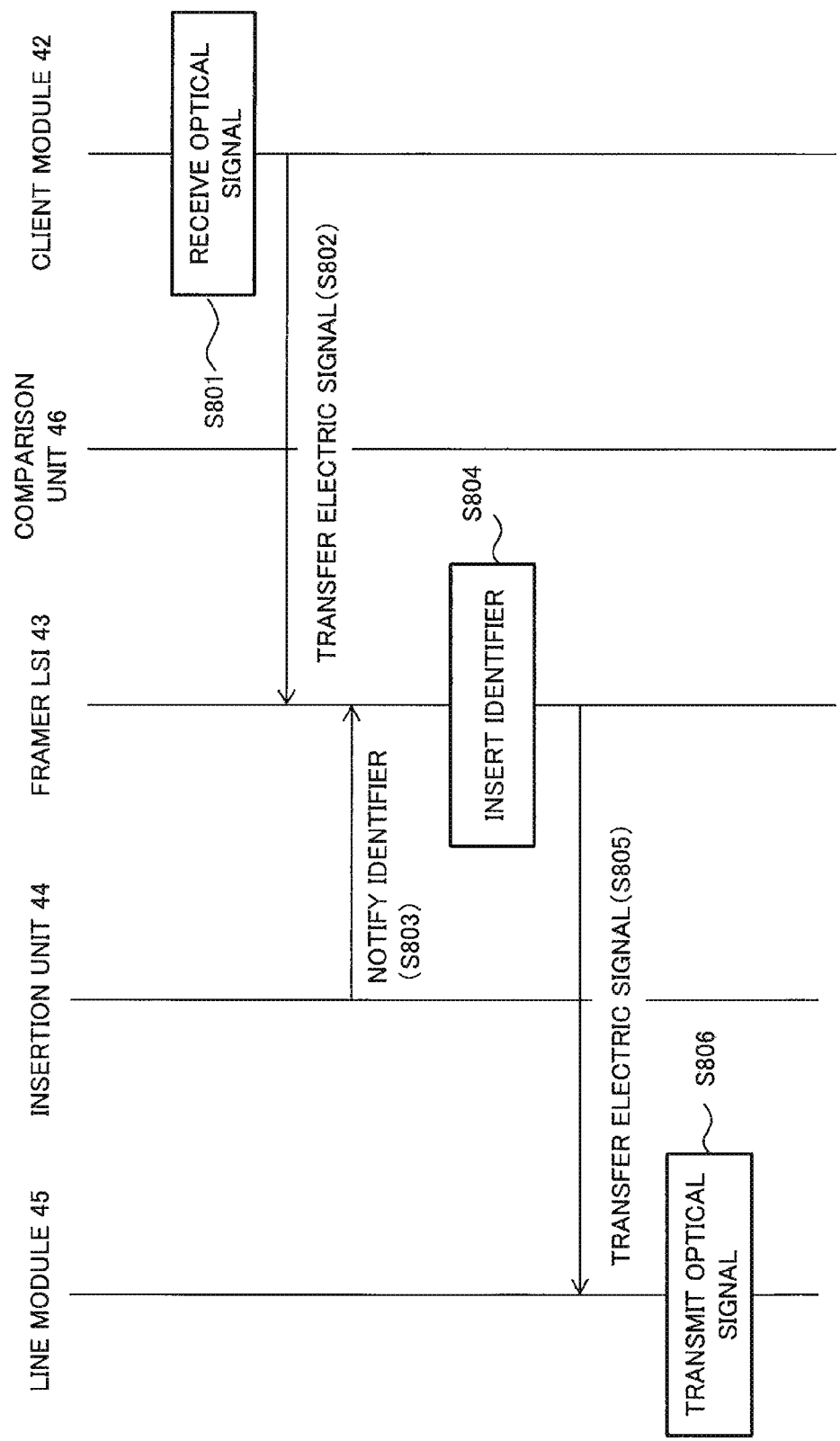
FIG. 20 is a sequence diagram illustrating another example of operation of the transponder according to the sixth exemplary embodiment of the present invention.

FIGS. 19 and 20 are sequence diagrams illustrating an example of operation of the transponder 41 according to the sixth exemplary embodiment of the present invention. FIG. 19 is a sequence diagram in the case where the transponder 41 receives the optical signal.

The line module 45 receives an input of an optical signal (line reception signal) from the wavelength separation multiplex unit 51 (S701). The line module 45 converts the received optical signal (line reception signal) into an electric signal (line signal frame), and outputs the electric signal (line signal frame) to the Framer LSI 43 (S702).

The Framer LSI 43 extracts a client signal from the electric signal (line signal frame) received from the line module 45, and outputs the client signal, as a client signal (electric signal), to the client module 42 (S703). Further, the Framer LSI 43 extracts the identifier stored in the header of the received electric signal (line signal frame), and notifies the identifier to the comparison unit 46 (S704).

The comparison unit 46 compares the identifier that has been notified from the Framer LSI 43 and the stored identifier (comparison information) of the transponder 41 with which communication is to be performed, and determines whether the identifiers of them both match each other or not (S705). The comparison unit 46 notifies the determination result to the client module 42 (S706).

In accordance with a determination result that has been notified from the comparison unit 46 (notification signal including information indicating agreement or disagreement), the client module 42 converts the electric signal (client signal) received from the Framer LSI 43 into an optical signal and outputs the optical signal, or discards the electric signal (client signal) (S707). More specifically, in the case of a determination result indicating agreement (notification signal including information indicating agreement), the client module 42 converts the received electric signal into an optical signal, and transmits the optical signal to the client apparatus 50. In contrast, in the case of a determination result indicating disagreement (notification signal including information indicating disagreement), the client module 42 discards the electric signal (client signal).

Besides, FIG. 20 is a sequence diagram in the case where the transponder 41 transmits an optical signal.

The client module 42 receives an optical signal from the client apparatus 50 (S801). The client module 42 converts the optical signal received from the client apparatus 50 into an electric signal, and outputs the electric signal, as a client reception signal, to the Framer LSI 43 (S802).

The insertion unit 44 notifies the identifier of the transponder 41 to the Framer LSI 43 (S803).

The Framer LSI 43 stores the identifier of the transponder 41 that has been notified from the insertion unit 44 into the line signal frame accommodating the client reception signal (S804).

The Framer LSI 43 outputs the line signal frame (electric signal) to the line module 45 (S805).

The line module 45 converts the electric signal which is output by the Framer LSI 43 (i.e., the line signal frame) into an optical signal of a predetermined wavelength, and outputs the optical signal to the wavelength separation multiplex unit 51 (S806).

Figure 21:
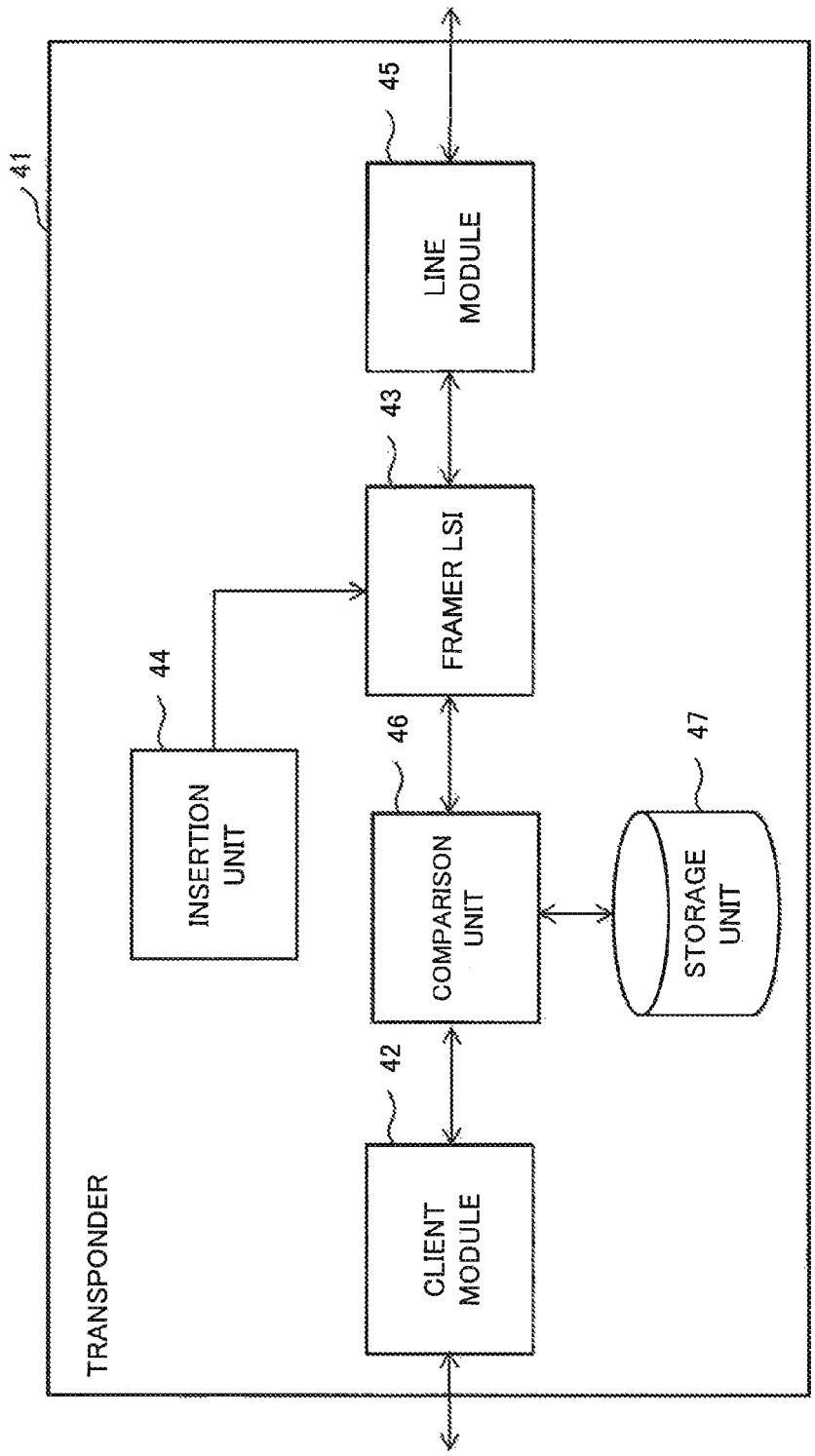
FIG. 21 is a figure illustrating another example of a configuration of the transponder according to the sixth exemplary embodiment of the present invention.

It should be noted that in the sixth exemplary embodiment of the present invention, the transponder 41 may be a configuration as shown in FIG. 21.

The Framer LSI 43 of the transponder 41 shown in FIG. 21 extracts the client signal from the line signal frame received from the line module 45, and outputs the client signal, as an electric signal, to the comparison unit 46.

The comparison unit 46 of the transponder 41 compares the identifier stored in the storage unit 47 in advance (comparison information) and the identifier included in the electric signal received from the Framer LSI 43, and outputs the electric signal to the client module 42 in accordance with matching of the identifiers. In contrast, the comparison unit 46 discards the electric signal in accordance with disagreement of the identifiers.

The client module 42 converts the electric signal received from the comparison unit 46 into an optical signal, and transmits the optical signal, as a client signal, to the client apparatus 50.

As described above, in the sixth exemplary embodiment of the present invention, the transponder 41 determines whether the received signal is transmitted from the apparatus with which communication is to be performed, and determines whether to transmit the signal to the client apparatus 50 on the basis of the result of the determination. As a result of the determination, the signal determined not to be transmitted from the apparatus with which communication is to be performed is discarded and is not transmitted to the client apparatus 50.

Therefore, in the sixth exemplary embodiment of the present invention, the transponder 41 can transmit only the signal received from the appropriate apparatus with which communication is to be performed (configured in advance) to the client apparatus 50. More specifically, the transponder 41 according to the sixth exemplary embodiment of the present invention discards the optical signal received from an apparatus that is not the apparatus with which the apparatus in question is to communicate and does not transfer the optical signal to the client apparatus 50. Therefore, the optical signal is prevented from being transferred to the client apparatus 50 that is not the intended transmission destination apparatus, and the client apparatus 50 does not receive the optical signal. As a result, the confidentiality of the information included in the optical signal can be ensured.

Seventh Exemplary Embodiment

The seventh exemplary embodiment of the present invention will be explained with reference to drawings.

Figure 22:
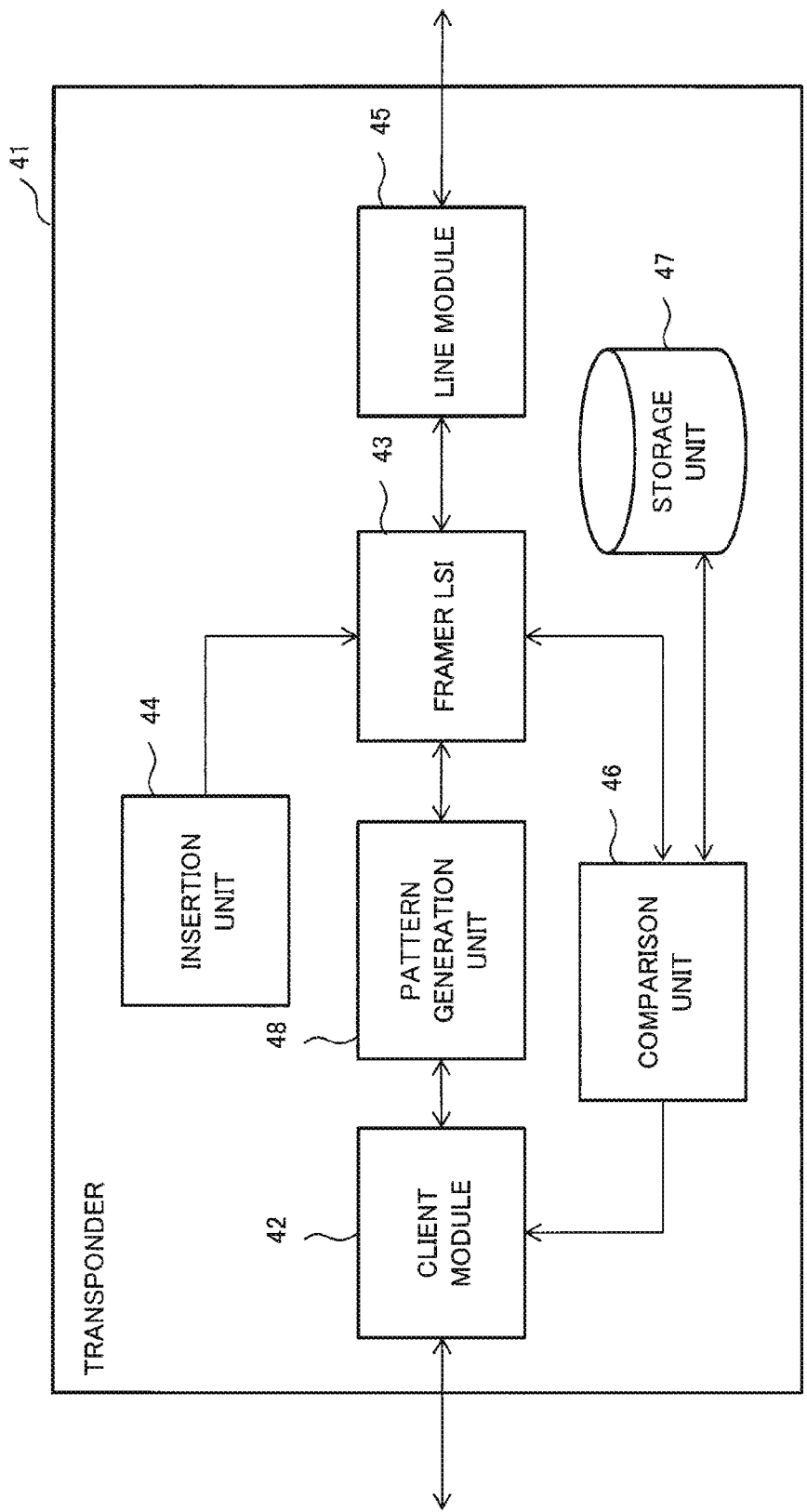
FIG. 22 is a figure illustrating an example of a configuration of a transponder according to a seventh exemplary embodiment of the present invention.

FIG. 22 is a figure illustrating an example of a configuration of the transponder 41 according to the seventh exemplary embodiment of the present invention. As shown in FIG. 22, the transponder 41 has a pattern generation unit 48.

First, a case where the transponder 41 receives an optical signal will be explained.

The comparison unit 46 refers to the storage unit 47 to determine whether the identifier that has been notified from the Framer LSI 43 matches the stored identifier (comparison information) or not. The comparison unit 46 notifies the determination result (a notification signal including information indicating agreement or disagreement) to the pattern generation unit 48.

In a case where the pattern generation unit 48 receives the notification signal indicating agreement from the comparison unit 46, the pattern generation unit 48 outputs the electric signal received from the Framer LSI 43 to the client module 42 as it is. In contrast, in a case where the pattern generation unit 48 receives the notification signal indicating disagreement from the comparison unit 46, the pattern generation unit 48 outputs, instead of the electric signal, an electric signal including a dummy pattern in which 0 and 1 are randomly arranged or a fixed pattern in which 0 and 1 are arranged in a particular pattern or an electric signal in which a bit string is randomly interchanged to the client module 42.

The client module 42 converts the electric signal received from the Framer LSI 43 into an optical signal, and transmits the optical signal to the client apparatus 50 as a client signal.

Subsequently, the case where the transponder 41 transmits an optical signal will be explained.

The Framer LSI 43 extracts a client signal from the line signal frame received from the line module 45, and outputs the client signal to the client module 42 as an electric signal. At this occasion, the Framer LSI 43 extracts the identifier stored in a predetermined area of the header of the line signal frame, and notifies the extracted identifier to the comparison unit 46.

Further, the Framer LSI 43 also extracts information about a processing result of the optical signal of the opposed apparatus (i.e., whether the optical signal is transferred to the apparatus in a subsequent stage or discarded) stored in the predetermined area of the header of the line signal frame.

The Framer LSI 43 notifies the processing result of the optical signal extracted (the determination result of the comparison unit 46 of the opposed apparatus) to the pattern generation unit 48.

The pattern generation unit 48 receives an input of the client reception signal (electric signal) from the client module 42. In accordance with the processing result that has been notified from the Framer LSI 43, the pattern generation unit 48 determines whether to perform code conversion on the received client reception signal in accordance with a predetermined method. Further, the pattern generation unit 48 determines whether the output signal is replaced with a dummy signal not including any information.

In accordance with the determination of performing the processing, the pattern generation unit 48 performs the processing on the client reception signal, and thereafter, outputs the processed client reception signal to the Framer LSI 43. In contrast, in accordance with the determination of not performing the processing, the pattern generation unit 48 outputs the client reception signal to the Framer LSI 43 as it is.

The pattern generation unit 48 receives a notification of the determination result of the comparison unit 46 of the opposed apparatus (a notification signal including information indicating agreement or disagreement) from, for example, the Framer LSI 43.

In a case where the determination result is "disagreement of the identifiers", the pattern generation unit 48 performs predetermined processing on the signal which is to be transmitted. For example, the pattern generation unit 48 serves as a scrambler to perform code conversion on the client reception signal in accordance with a predetermined method so that it cannot be decoded by the apparatus with which communication is to be performed, and the pattern generation unit 48 outputs the client reception signal to the Framer LSI 43. While, for example, the pattern generation unit 48 replaces the output signal with, for example, a dummy signal not including information, and outputs the client reception signal to the Framer LSI 43. In contrast, in a case where the determination result is "agreement of the identifiers", the pattern generation unit 48 outputs the client reception signal to the Framer LSI 43 as it is.

Further, processing in which the transponder 41 notifies the processing result of the optical signal (i.e., whether the identifiers agree or not) to the opposed apparatus will be explained.

In the seventh exemplary embodiment of the present invention, the comparison unit 46 compares the identifier notified from the Framer LSI 43 and the stored identifier of the transponder 41 with which communication is to be performed, and determines whether both of them match or not. The comparison unit 46 notifies the determination result (a notification signal including information indicating agreement or disagreement) to the client module 42 and the Framer LSI 43.

The determination result that has been notified from the comparison unit 46 to the Framer LSI 43 (a notification signal including information indicating agreement or disagreement) is notified to the apparatus which transmitted the optical signal (i.e., opposed apparatus). The Framer LSI 43 stores the determination result into the predetermined area of the header of the line signal frame which is to be output to the line module (a frame transmitted to the opposed apparatus) in order to notify the determination result to the opposed apparatus. Further, the Framer LSI 43 may notify it to the opposed apparatus (the transponder 41 with which communication is to be performed) via a communication path (not shown) other than the transmission path 20.

Figure 23:
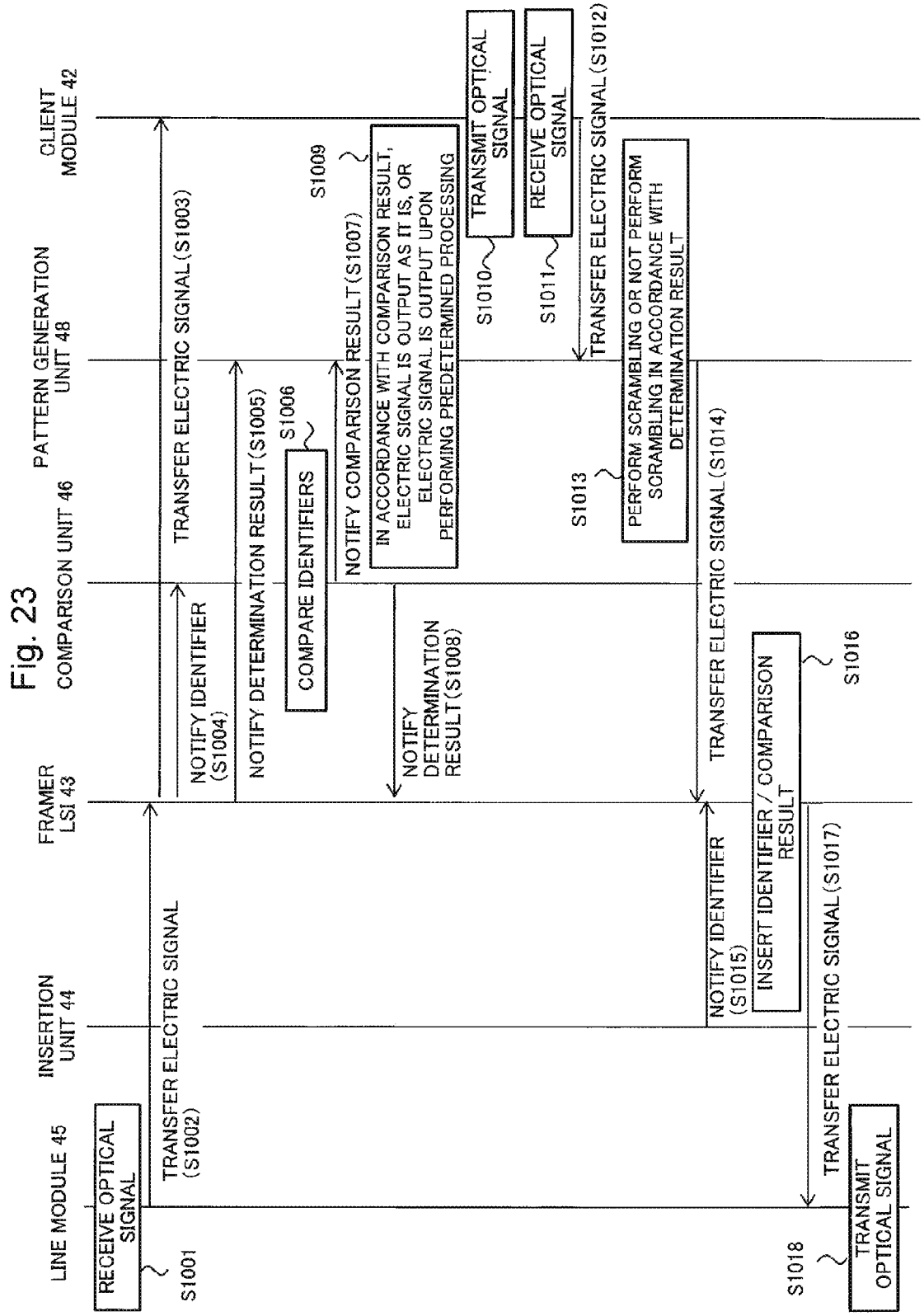
FIG. 23 is a sequence diagram illustrating an example of operation of the transponder according to the seventh exemplary embodiment of the present invention.

FIG. 23 is a sequence diagram illustrating an example of operation of the transponder 41 according to the seventh exemplary embodiment of the present invention.

The line module 45 receives an input of the optical signal (line reception signal) from the wavelength separation multiplex unit 51 (S1001). The line module 45 converts the received optical signal (line reception signal) into an electric signal (line signal frame), and outputs the electric signal (line signal frame) to the Framer LSI 43 (S1002).

The Framer LSI 43 extracts the client signal from the electric signal (line signal frame) received from the line module 45, and outputs the electric signal to the client module 42 as a client signal (electric signal) (S1003). Further, the Framer LSI 43 also extracts the identifier stored in the header of the received electric signal (line signal frame), and notifies the identifier to the comparison unit 46 (S1004). Furthermore, the Framer LSI 43 extracts information about the processing result of the optical signal in the opposed apparatus (whether the identifiers match or not) stored in a predetermined area of the header of the line signal frame, and notifies the information to the pattern generation unit 48 (S1005). It should be noted that FIG. 23 shows an example where the information about the processing result is a determination result of the comparison unit 46 in the opposed apparatus (the transponder 41 of the communication apparatus).

The comparison unit 46 compares the identifier notified from the Framer LSI 43 and the stored identifier, and determines whether both of them match each other or not (S1006). The comparison unit 46 notifies the determination result (a notification signal including information indicating agreement or disagreement) to the pattern generation unit 48 (S1007). Further, the comparison unit 46 also notifies the determination result (a notification signal including information indicating agreement or disagreement) to the Framer LSI 43 (S1008).

In accordance with the determination result that has been notified from the comparison unit 46 (a notification signal including information indicating agreement or disagreement), the pattern generation unit 48 outputs the electric signal (client signal) received from the Framer LSI 43 to the client module 42 as it is, or outputs the electric signal (client signal) to the client module 42 upon performing the predetermined processing (S1009).

The client module 42 converts the electric signal (client signal) received from the pattern generation unit 48 into an optical signal, and transmits the optical signal to the client apparatus 50 (S1010).

The client module 42 receives the optical signal from the client apparatus 50 (S1011). The client module 42 converts the optical signal received from the client apparatus 50 into an electric signal, and outputs the electric signal to the pattern generation unit 48 as a client reception signal (S1012).

In the determination result notified in step 1005 (S1005) (a notification signal including information indicating agreement or disagreement), the pattern generation unit 48 outputs the received client reception signal to the Framer LSI 43 as it is, or outputs the received client reception signal to the Framer LSI 43 (S1014) upon predetermined processing of the received client reception signal (S1013).

The insertion unit 44 notifies the identifier of the transponder 41 to the Framer LSI 43 (S1015).

The Framer LSI 43 stores the identifier of the transponder 41 that has been notified from the insertion unit 44 and information about the determination result notified in step 1008 (S1008) into the line signal frame accommodating the client reception signal (S1016).

The Framer LSI 43 outputs the line signal frame (electric signal) to the line module 45 (S1017).

The line module 45 converts the electric signal (i.e., line signal frame) that is output by the Framer LSI 43 into an optical signal of a predetermined wavelength, and outputs the optical signal to the wavelength separation multiplex unit 51 (S1018).

Figure 24:
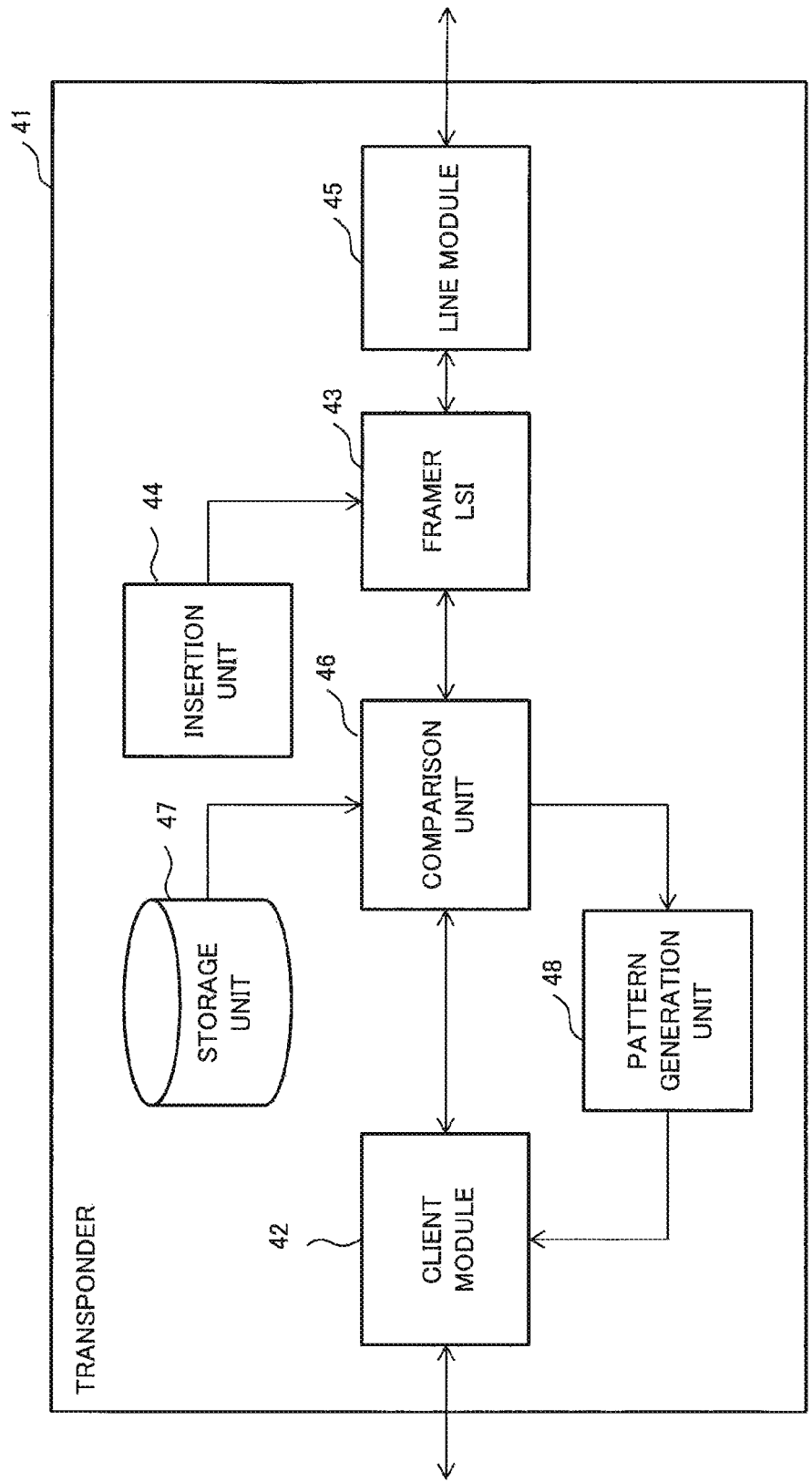
FIG. 24 is a figure illustrating another example of a configuration of the transponder according to the seventh exemplary embodiment of the present invention.

It should be noted that, in the seventh exemplary embodiment of the present invention, the transponder 41 may have a configuration as shown in FIG. 24.

The Framer LSI 43 of the transponder 41 as shown in FIG. 24 extracts the client signal from the line signal frame received from the line module 45, and outputs the client signal to the comparison unit 46 as an electric signal.

The comparison unit 46 compares the identifier (comparison information) stored in the storage unit 47 in advance and the identifier included in the electric signal received from the Framer LSI 43, and outputs the electric signal to the client module 42 in accordance with agreement between the identifiers from each other.

In contrast, in a case where the identifiers do not match each other, the comparison unit 46 outputs a notification signal including information indicating disagreement to the pattern generation unit 48.

In a case where the pattern generation unit 48 receives a notification signal from the comparison unit 46, the pattern generation unit 48 generates an electric signal including a dummy pattern or a fixed pattern, and outputs the electric signal to the client module 42.

Here, in this case, instead of the generation of the dummy pattern and the fixed pattern, the pattern generation unit 48 may serve as a scrambler to randomly interchange the bit string of the electric signal that is input from the comparison unit 46 to the client module 42.

In a case where the client module 42 receives the electric signal from the comparison unit 46, the client module 42 converts the electric signal received from the comparison unit 46 into the optical signal, and outputs the optical signal to the client apparatus 50 as a client signal. In contrast, in a case where the transmission unit 12 receives the electric signal including the dummy pattern or the fixed pattern from the pattern generation unit 48, the transmission unit 12 converts the electric signal including the dummy pattern or the fixed pattern received from the pattern generation unit 48 into an optical signal, and outputs the optical signal to the client apparatus 50.

As described above, in the seventh exemplary embodiment of the present invention, the pattern generation unit 48 performs predetermined processing on the output signal in accordance with the predetermined condition. The optical reception apparatus 1-1 discards the optical signal transmitted from the apparatus with which communication is to be performed, and in addition, the predetermined processing is performed on the optical signal transmitted by the optical transmission apparatus 1-2, and therefore, the confidentiality of the optical signal can be duplexed, and the confidentiality of the information included in the optical signal can be enhanced.

Eighth Exemplary Embodiment

The eighth exemplary embodiment of the present invention will be explained with reference to drawings.

In the eighth exemplary embodiment of the present invention, the transponder 41 includes encryption means (an encoding unit 61 and a decoding unit 62), and performs the encryption processing on the optical signal which is to be transmitted. Then, only the apparatus with which the apparatus in question is to communicate (the transponder 41 which is set as the apparatus with which the apparatus in question is to communicate) is configured to be able to decode the encrypted optical signal, so that the confidentiality of the information included in the optical signal is ensured.

Figure 25:
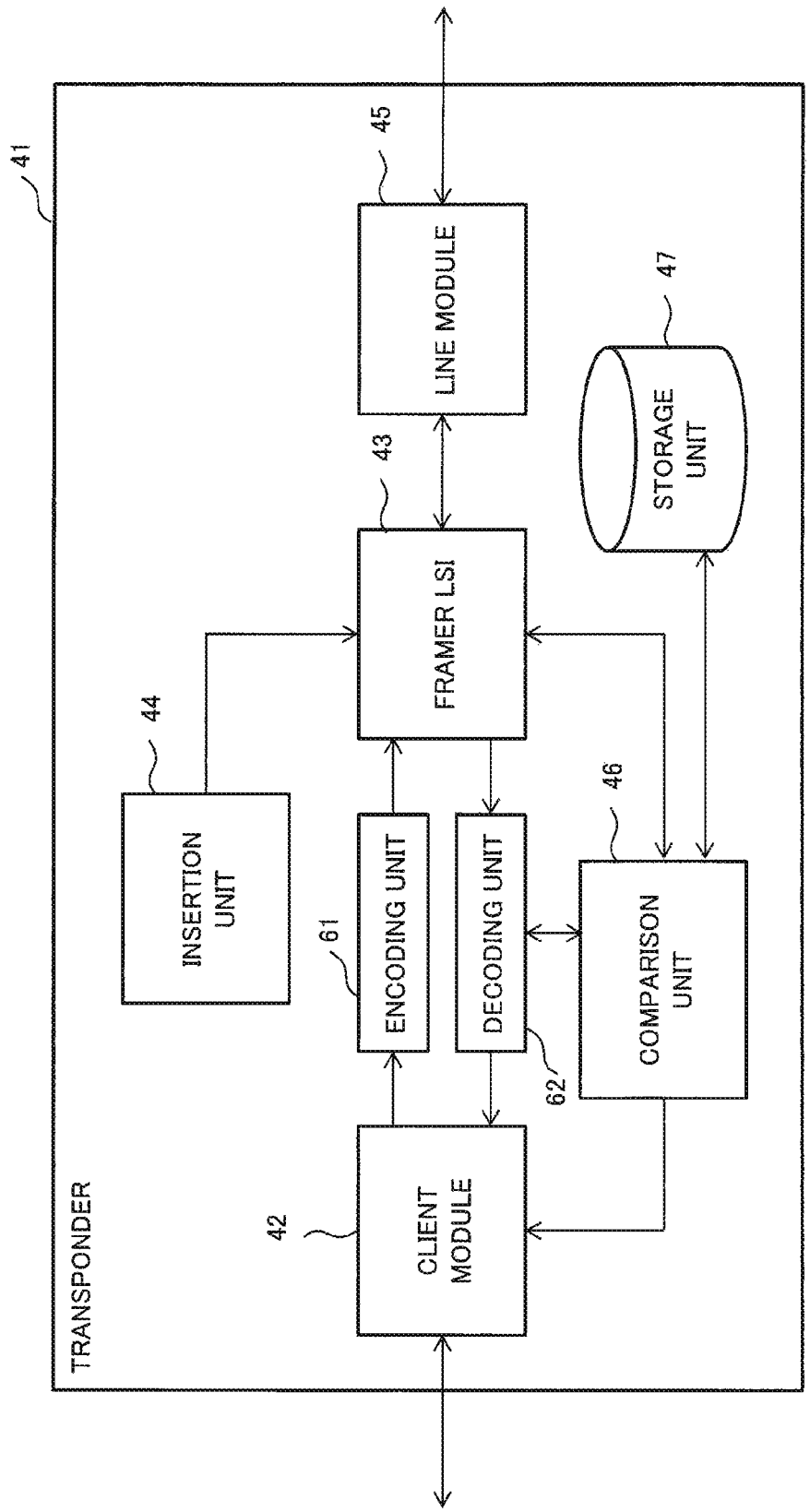
FIG. 25 is a figure illustrating an example of a configuration of a transponder according to an eighth exemplary embodiment of the present invention.

FIG. 25 is a figure illustrating an example of a configuration of the transponder 41 according to the eighth exemplary embodiment of the present invention. As shown in FIG. 25, the transponder 41 includes an encoding unit 61 and a decoding unit 62.

First, processing in which the transponder 41 encrypts and transmits an optical signal will be explained.

In the eighth exemplary embodiment of the present invention, the encoding unit 61 encrypts the client signal (electric signal) received from the client module 42.

The encryption method executed by the encoding unit 61 is the symmetric key encoding method. The symmetric key encoding method is a method using a key which is common to the encryption and the decoding. In a case where the encoding unit 61 encrypts the client signal in accordance with the symmetric key encoding method, both of the transponder 41 of the apparatus in question and the transponder 41 of the apparatus with which communication is to be performed hold the common key (hereinafter referred to as the "symmetric key"). The signal which is encrypted with the symmetric key can be decoded by only the apparatus having the symmetric key with which communication is to be performed, and therefore, even if the signal encrypted by the apparatus that is not the apparatus with which communication is to be performed is received, the information included in the signal cannot be extracted, and the confidentiality of the information included in the signal can be ensured.

Instead of the symmetric key encoding method, a public key encoding method may be used as the encryption method executed by the encoding unit 61. The public key encoding method is a method in which different keys are used for the encryption and the decoding. The key used for encryption (public key) is published, but the key used for decoding (secret key) is held by only the decoding apparatus. The signal which is encrypted with the public key can be decoded with only the secret key, and therefore, the apparatus that does not hold the secret key cannot decode the encrypted information, and the confidentiality of the signal can be ensured.

In a case where the encoding unit 61 encrypts the client signal in accordance with the public key encoding method, the transponder 41 of the apparatus in question obtains, in advance, the public key from the transponder 41 of the apparatus with which communication is to be performed. The signal encrypted with the public key can be decoded by only the apparatus holding the secret key with which communication is to be performed, and therefore, even when an apparatus that is not the intended apparatus with which communication is to be performed receives the encrypted signal, the confidentiality of the information included in the signal can be ensured.

First, processing in a case where the transponder 41 receives an encrypted optical signal will be explained.

The decoding unit 62 executes decoding of the electric signal (client signal) received from the Framer LSI 43. In a case of the symmetric key encoding method, the decoding unit 62 uses the symmetric key to execute the decoding of the client signal. In a case of the public key encoding method, the decoding unit 62 uses the secret key to execute the decoding of the client signal.

The decoding unit 62 notifies the identifier included in the decoded signal to the comparison unit 46. Further, the decoding unit 62 outputs the client signal to the client module 42 or the comparison unit 46.

The comparison unit 46 compares the identifier that has been notified from the decoding unit 62 and the stored identifier of the transponder 41 with which communication is to be performed, and determines whether both of them match each other or not. In a case where the decoding unit 62 was able to decode the client signal, and the identifier is the identifier of the transponder 41 of the apparatus with which communication is to be performed, the comparison unit 46 determines that the identifiers of both of them match each other. In cases other than the above, the comparison unit 46 determines disagreement therebetween. The comparison unit 46 notifies a determination result (a notification signal including information indicating agreement or disagreement) to the client module 42 and the Framer LSI 43.

The client module 42 transmits the client signal which is output from the decoding unit 62 or the comparison unit 46 to the client apparatus 50.

Subsequently, the case where the transponder 41 transmits an optical signal will be explained.

In the eighth exemplary embodiment of the present invention, the encoding unit 61 encrypts the client reception signal (electric signal) received from the client module 42. In the case of the symmetric key encoding method, the encoding unit 61 uses the symmetric key to encrypt the client reception signal. In the case of the public key encoding method, the encoding unit 61 encrypts the client reception signal by using the public key obtained in advance from the apparatus with which communication is to be performed.

The encoding unit 61 outputs the encrypted client reception signal to the Framer LSI 43.

Figure 26:
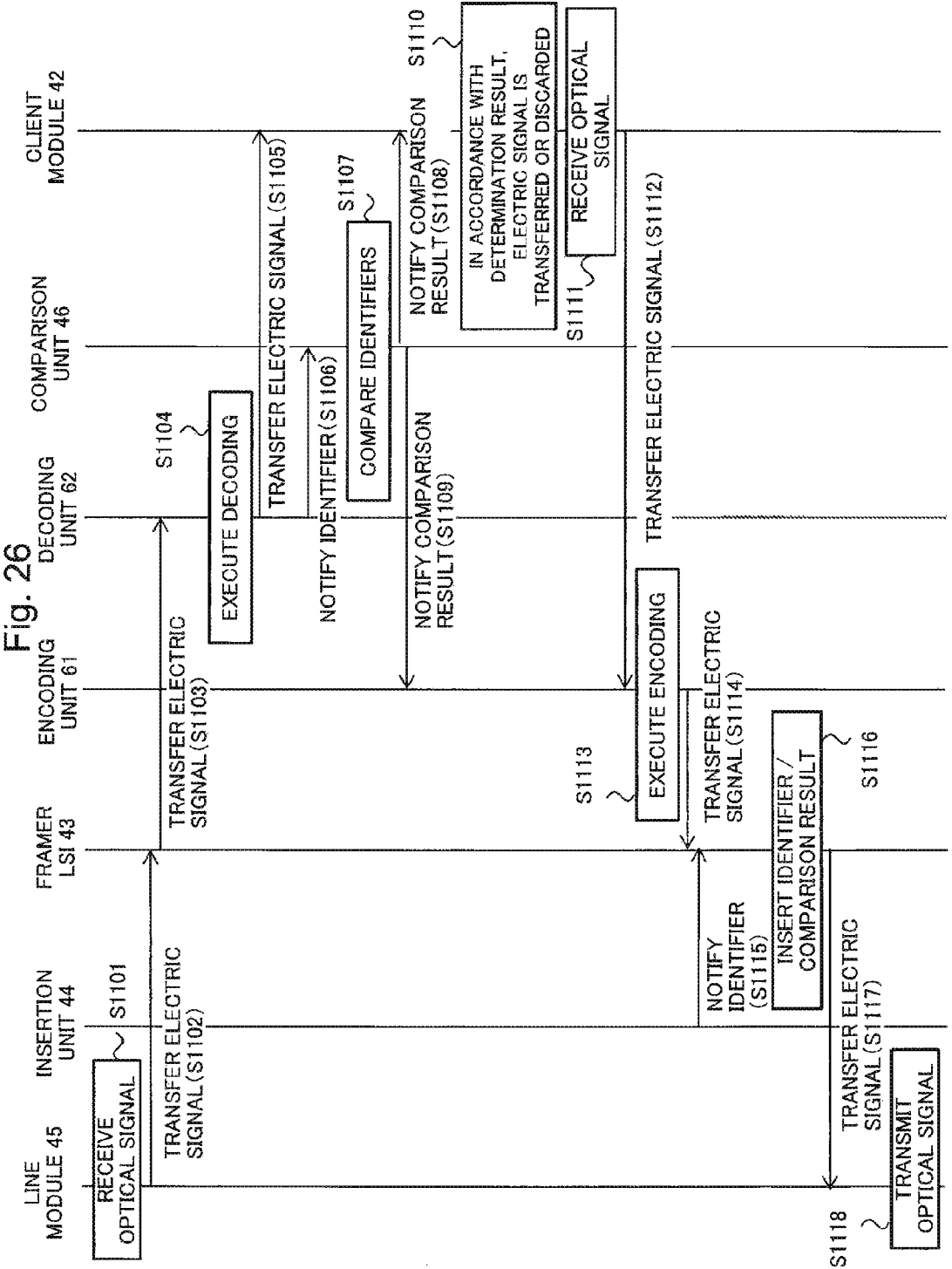
FIG. 26 is a sequence diagram illustrating an example of operation of the transponder according to the eighth exemplary embodiment of the present invention.

FIG. 26 is a sequence diagram illustrating an example of operation of the transponder 41 according to the eighth exemplary embodiment of the present invention.

The line module 45 receives an input of the optical signal (line reception signal) from the wavelength separation multiplex unit 51 (S1101). The line module 45 converts the received optical signal (line reception signal) into an electric signal (line signal frame), and outputs the electric signal (line signal frame) to the Framer LSI 43 (S1102).

The Framer LSI 43 extracts the client signal from the electric signal (line signal frame) received from the line module 45, and outputs the client signal from the electric signal to the decoding unit 62 as a client signal (electric signal) (S1103).

The decoding unit 62 executes the decoding of the client signal received from the Framer LSI 43 (S1104). The decoding unit 62 notifies the decoded electric signal to the client module 42 (S1105), and notifies the identifier included in the decoded signal to the client module 42 (S1106).

The comparison unit 46 compares the identifier that has been notified from the decoding unit 62 and the stored identifier (comparison information), and determines whether both of them match each other or not (S1107). The comparison unit 46 notifies the determination result (a notification signal including information indicating agreement or disagreement) to the client module 42 (S1108), and also notifies the determination result (a notification signal including information indicating agreement or disagreement) to the encoding unit 61 (S1109).

In accordance with the determination result that has been notified from the comparison unit 46 (a notification signal including information indicating agreement or disagreement), the client module 42 transmits the electric signal (client signal) received from the decoding unit 62 upon converting the electric signal (client signal) into an optical signal, or discards the electric signal (client signal) (S1110).

The client module 42 receives the optical signal from the client apparatus 50 (S1111). The client module 42 converts the optical signal received from the client apparatus 50 into an electric signal, and outputs the electric signal to the encoding unit 61 as a client reception signal (S1112).

The encoding unit 62 encrypts the client reception signal (electric signal) received from the client module 42 (S1113), and outputs the client reception signal (electric signal) to the Framer LSI 43 (S1114).

The insertion unit 44 notifies the identifier of the transponder 41 to the Framer LSI 43 (S1115).

The Framer LSI 43 stores the identifier of the transponder 41 notified from the insertion unit 44 into the line signal frame accommodating the client reception signal (S1116).

The Framer LSI 43 outputs the line signal frame (electric signal) to the line module 45 (S1117).

The line module 45 converts the electric signal (i.e., line signal frame) which is output from the Framer LSI 43 into an optical signal of a predetermined wavelength, and outputs the optical signal to the wavelength separation multiplex unit 51 (S1118).

As described above, in the eighth exemplary embodiment of the present invention, the transponder 41 has encryption means (the encoding unit 61 and the decoding unit 62), and performs encryption processing on the optical signal which is to be transmitted. Then, only the apparatus with which the apparatus in question is to communicate (the transponder 41 which is set as the apparatus with which the apparatus in question is to communicate) is configured to be able to decode the encrypted optical signal, so that the confidentiality of the information included in the optical signal is ensured.

Ninth Exemplary Embodiment

The ninth exemplary embodiment of the present invention will be explained with reference to drawings.

In the ninth exemplary embodiment of the present invention, in a case where a fault occurs in a part of the transmission path 20, and an optical signal from some of the base stations is lost, a BU (optical branch apparatus) 30 switches the route, so that the lost optical signal is compensated by an optical signal from another base station.

The total power of the optical signal transmitted through the transmission path 20 is configured to be set at a constant level, and in a case where some wavelength component of the optical signal is lost due to disconnection of the transmission path 20 and the like, the other wavelength components of the optical signal is amplified, so that the total power of the optical signal is maintained at a constant level.

However, when only the power of a particular wavelength component of the optical signal is increased and the power becomes equal to or more than a predetermined value, the optical spectrum is changed due to, e.g., degradation of the waveform of the optical signal by the nonlinear effect of the optical fiber, and the transmission quality of the optical signal is degraded.

Therefore, in the ninth exemplary embodiment of the present invention, in a case where the optical signal from some of the base stations is cut off, and some wavelength component of the optical signal transmitted in the transmission path 20 is lost, the lost wavelength component is compensated by the optical signal from another base station. Hence, the increase of only the power of a particular wavelength component of the optical signal is prevented, and the degradation of the transmission quality of the optical signal is suppressed.

However, in the ninth exemplary embodiment of the present invention, the transponder 41 at the reception side discards the optical signal from an apparatus that is not the intended apparatus with which communication is to be performed, and therefore, the optical signal used for the compensation is discarded by the transponder 41. Therefore, the client apparatus 50 that is not the intended apparatus to which the optical signal used for the compensation is transmitted would not receive the optical signal. Therefore, in the ninth exemplary embodiment of the present invention, some wavelength component that is lost can be compensated with regard to the optical signal transmitted in the transmission path 20, and the optical signal used for the compensation is prevented from being received by the client apparatus 50.

FIG. 27 is a figure illustrating an example of a configuration of a communication system before a fault occurs in the transmission path 20 in the ninth exemplary embodiment of the present invention. As shown in FIG. 27, each base station 10 is mutually connected with the opposed base station 10 via the BU 30.

FIG. 28 is a table illustrating the optical signal transmitted in sections between the A base station 10-1 and the BU 30 and between the BU 30 and the B base station 10-2 of the communication system as shown in FIG. 27. No fault occurs in the transmission path 20, and therefore, five sets of transponders 41 of each base station are communicating with each other in each of the sections between the A base station 10-1 and the BU 30 and between the BU 30 and the B base station 10-2.

Figure 29:
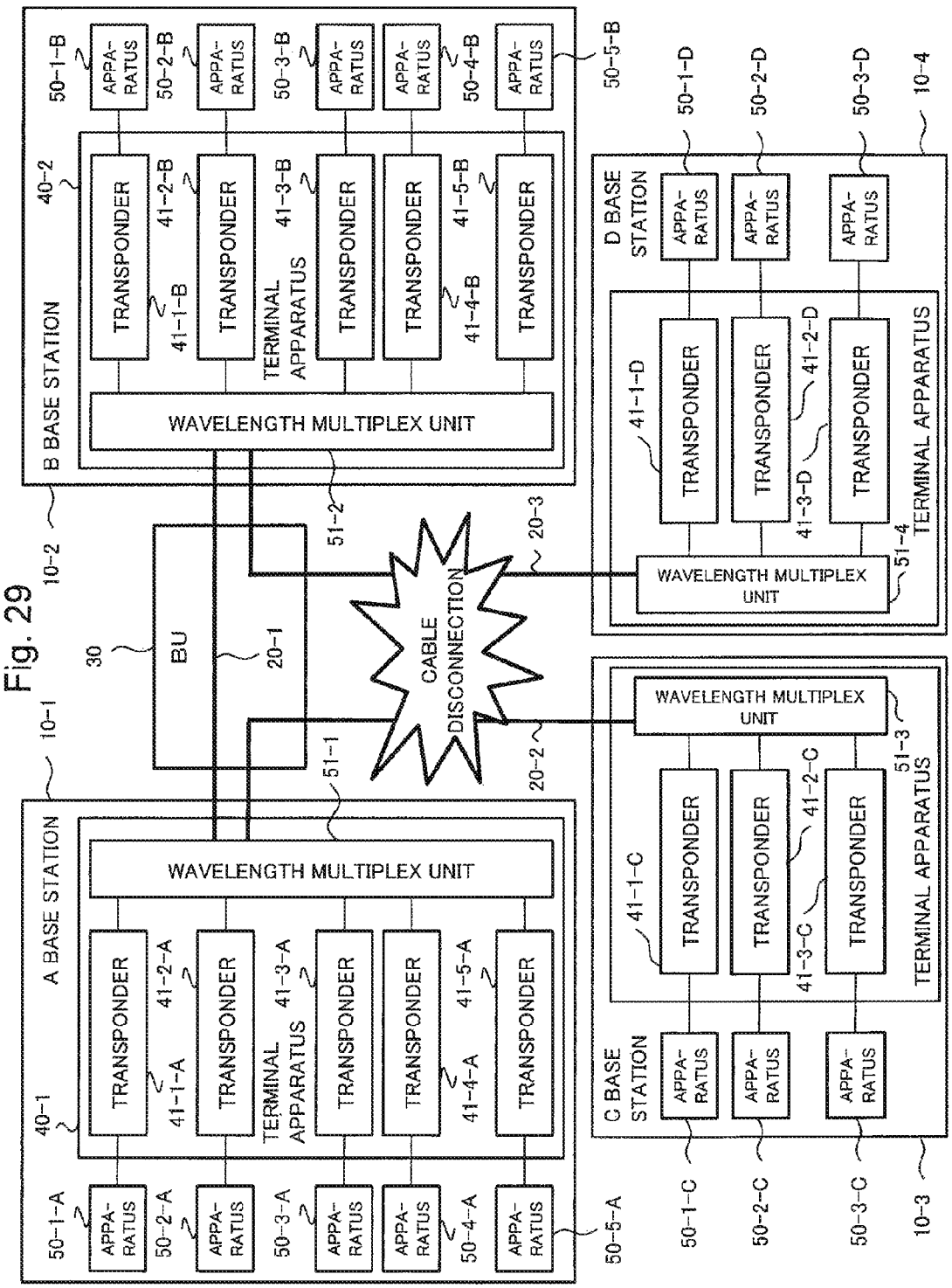
FIG. 29 is a figure illustrating an example of a configuration of a communication system after a fault that has occurred in a transmission path, according to the ninth exemplary embodiment of the present invention.

FIG. 29 is an example of a configuration of a communication system in a case where a fault occurs in a part of the transmission path 20, and the optical signal from some of the base stations 10 is lost, in the ninth exemplary embodiment of the present invention.

FIG. 29 illustrates, for example, an example in a communication system in a case where a fault occurs in the transmission paths 20-2 and 20-3 between the C base station and the D base station and the BU, and the optical signal from the C base station and D base station to the BU is lost. More specifically, in the optical signal transmitted in a section between the A base station 10-1 and the BU 30 and a section between the BU 30 and the B base station 10-2, the wavelength components of the optical signal transmitted and received between the A base station 10-1 and the C base station 10-3 and between the B base station 10-2 and the D base station 10-4 are lost.

FIG. 30 is a table illustrating a connection relationship of the transponder 41 transmitting and receiving the optical signal in a section between the A base station 10-1 and the BU 30 and a section between the BU 30 and the B base station 10-2 in the communication system as shown in FIG. 29. As described above, since a fault occurs in the transmission path 20 between the C base station and the D base station and the BU, the connection between the A base station 10-1 and the C base station 10-2 and the connection between the B base station 10-2 and the D base station 10-4 are disconnected. Therefore, as shown in FIG. 30, in the section between the A base station 10-1 and the BU 30 and the section between the BU 30 and the B base station 10-2, the connection remains only between the A base station 10-1 and the B base station 10-2.

However, the transmission quality of the optical signal continued to be transmitted in the state of FIG. 29 and FIG. 30 (in a state where some of the wavelength components are lost in the optical signal multiplexed by wavelength multiplex) is degraded as described above. Therefore, in the ninth exemplary embodiment of the present invention, the BU 30 switches the route, so that the lost optical signal is compensated by the optical signal from another base station.

In the ninth exemplary embodiment of the present invention, the BU 30 switches the route so that the optical signals of the transponders 41-3-A, 41-4-A, and 41-5-A of the A base station 10-1 are received by the transponders 41-3-B, 41-4-B, and 41-5-B of the B base station 10-2.

FIG. 31 is a table illustrating a connection relationship of the transponders 41 transmitting and receiving optical signals in a section between the A base station 10-1 and the BU 30 and a section between the BU 30 and the B base station 10-2 after the BU 30 switches the route. The BU 30 switches the route, and accordingly, in the transponders 41 of the A base station 10-1, the optical signals transmitted to and received from the transponders 41 of the C base station 10-3 are transferred to the transponders 41 of the B base station 10-2, so that the lost optical signal is compensated. Further, in the transponders 41 of the B base station 10-1, the optical signals transmitted to and received from the transponders 41 of the D base station 10-3 are transferred to the transponders 41 of the A base station 10-2, so that the lost optical signal is compensated.

The transponder 41 at the reception side discards the optical signal from an apparatus that is not the intended apparatus with which communication is to be performed. Therefore, the optical signal used for the compensation is discarded by the transponder 41 at the reception side. Hence, the client apparatus 50 would not receive the optical signal used for the compensation.

For example, the optical signal transmitted from the transponder 41-3-A of the A base station 10-1 is used for the compensation, and received by the transponder 41-3-B of the B base station 10-2. The apparatus of the intended recipient by which transmissions from the transponder 41-3-B of the B base station 10-2 are to be received is the transponder 41-1-D of the D base station 10-4. Therefore, the transponder 41-3-B of the B base station 10-2 discards the received optical signal on the basis of the fact that the identifier stored in the received optical signal is not the identifier of the transponder 41-1-D. As described above, the transponder 41-3-B of the B base station 10-2 would not transmit the optical signal used for the compensation (the optical signal transmitted from the transponder 41-3-A of the A base station 10-1) to the client apparatus 50.

In the ninth exemplary embodiment of the present invention, as described above, in a case where a fault occurs in the transmission path 20, and the optical signal from some of the base stations is lost, the BU 30 switches the route, and compensates the lost optical signal with an optical signal from another base station. Accordingly, the increase of only the power of a particular wavelength component of the optical signal is prevented, and the degradation of the transmission quality of the optical signal is suppressed. In addition, in the ninth exemplary embodiment of the present invention, the transponder 41 at the reception side discards the optical signal used for the compensation, and the client apparatus 50 is prevented from receiving the optical signal used for the compensation. Therefore, in the ninth exemplary embodiment of the invention of the present application, some of the lost wavelength components can be compensated with regard to the optical signal transmitted in the transmission path 20, and the optical signal used for the compensation is prevented from being received by the client apparatus 50.

Tenth Exemplary Embodiment

The tenth exemplary embodiment of the present invention will be explained with reference to drawings.

Figure 32:
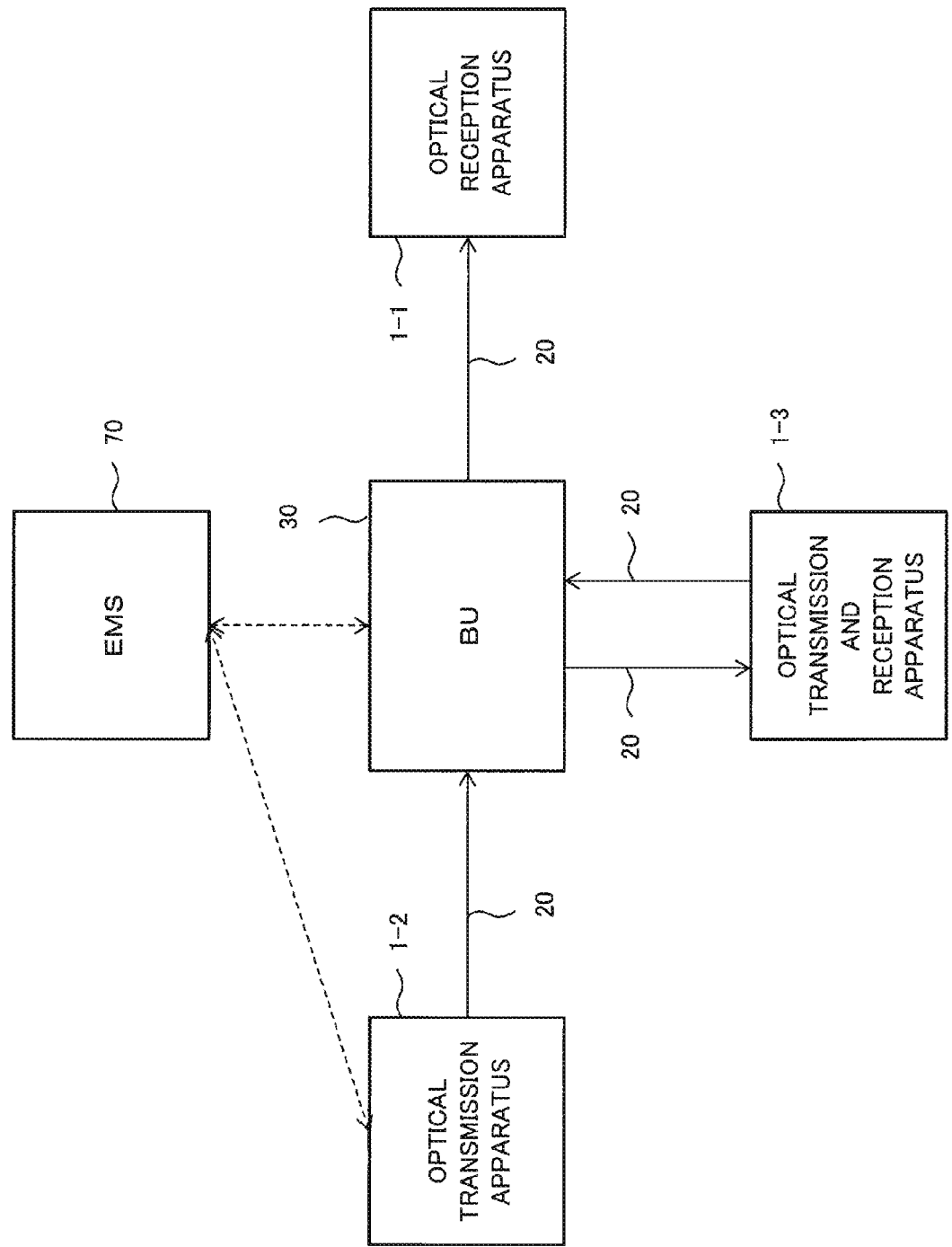
FIG. 32 is a figure illustrating an example of a configuration of an optical communication system according to a tenth exemplary embodiment of the present invention.

FIG. 32 is an example of a configuration of an optical communication system according to the tenth exemplary embodiment of the present invention. As shown in FIG. 32, the optical communication system includes an optical reception apparatus 1-1, an optical transmission apparatus 1-2, an optical transmission and reception apparatus 1-3, a transmission path 20, a BU 30, and an EMS (Element Management System) 70.

The EMS 70 is an apparatus for performing network management of the optical communication system, and collects information about the communication route of the optical signal from an apparatus included in the optical communication system. The EMS 70 detects a fault that has occurred in the transmission path 20 on the basis of the information about the communication route thus collected, and requests the BU 30 to switch the route. As shown in FIG. 29, in a case where a fault occurs in the transmission path 20 between the C base station and the D base station and the BU, the EMS 70 requests the BU 30 to switch the route so that the optical signals transmitted from the transponders 41-3-A, 41-4-A, and 41-5-A of the A base station 10-1 are received by the transponders 41-3-B, 41-4-B, and 41-5-B of the B base station 10-2.

Further, in response to detection of a fault that has occurred in the transmission path 20, the EMS 70 requests the pattern generation unit 48 of the transponder 41 that is included in the optical transmission apparatus 1-2 to perform predetermined processing on the optical signal. As shown in FIG. 29, in a case where a fault occurs in the transmission path 20 between the C base station and D base station and the BU, the EMS 70 requests the pattern generation unit 48 of the transponders 41-3-A, 41-4-A, and 41-5-A of the A base station 10-1 to perform the predetermined processing on the optical signal.

In response to a request from the EMS 70, the pattern generation unit 48 having received a request from the EMS 70 outputs, instead of the received electric signal, an electric signal including a dummy pattern in which 0 and 1 are randomly arranged or a fixed pattern in which 0 and 1 are arranged in a particular pattern, or an electric signal obtained by randomly interchanging a bit string to the line module 42.

Further, in a case where the BU 30 switches the route (in a case where a fault that has occurred in the transmission path 20 is detected), the EMS 70 requests the pattern generation unit 48 of the transponder 41 included in the optical reception apparatus 1-1 to output an electric signal, including a dummy pattern in which 0 and 1 are randomly arranged or a fixed pattern in which 0 and 1 are arranged in a particular pattern or an electric signal obtained by randomly interchanging a bit string to the client module 42.

It should be noted that in a case where the BU 30 switches the route (in a case where a fault that has occurred in the transmission path 20 is detected), the EMS 70 may request the transponder 41 included in the optical reception apparatus 1-1 to discard the optical signal (or the electric signal) (i.e. not to transmit the optical signal).

As described above, in the tenth exemplary embodiment of the present invention, the EMS 70 performs the network management, and requests the BU 30 to switch the route and requests the optical transmission apparatus 1-2 to transmit the optical signal upon performing the predetermined processing on the optical signal. Therefore, even in a case where the BU 30, the optical reception apparatus 1-1, and the optical transmission apparatus 1-2 cannot detect a fault of the transmission path 20, some of the lost wavelength components can be compensated with regard to the optical signal transmitted in the transmission path 20, and in addition, the optical signal used for the compensation can be prevented from being received by the client apparatus 50.

Eleventh Exemplary Embodiment

The eleventh exemplary embodiment of the present invention will be explained. In the eleventh exemplary embodiment, a computer, a CPU (Central Processing Unit), an MPU (Micro-Processing Unit) or the like of an optical transmission apparatus 1, a terminal apparatus 40, or a transponder 41 executes software (program) for realizing the functions of each exemplary embodiment explained above. It should be noted that in the eleventh exemplary embodiment of the present invention, the apparatus executing the software (program) is not limited to the optical transmission apparatus 1, the terminal apparatus 40, or the transponder 41, and may be any other apparatus.

In the eleventh exemplary embodiment of the present invention, the optical transmission apparatus 1, the terminal apparatus 40, or the transponder 41 obtains software (program) for realizing the functions of each exemplary embodiment explained above via various kinds of storage media or networks such as, e.g., a CD-R (Compact Disc Recordable). The programs obtained by the optical transmission apparatus 1, the terminal apparatus 40, or the transponder 41 or a storage medium storing the program constitute the present invention. It should be noted that the software (program) may be stored in advance to, for example, a predetermined storage unit included in the optical transmission apparatus 1, the terminal apparatus 40, or the transponder 41.

The computer, the CPU, the MPU, or the like of the optical transmission apparatus 1, the terminal apparatus 40, or the transponder 41 read and execute the program code of the software (program) thus obtained. Therefore, the same processing as the processing of the node 1 (open flow switch) or the control apparatus 3 (open flow controller) in each of the exemplary embodiments explained above is executed.

According to the eleventh exemplary embodiment of the present invention can be applied for the purpose of, e.g., a program for realizing the computer, the CPU, the MPU, or the like of the optical transmission apparatus 1, the terminal apparatus 40, or the transponder 41.

As described above, the exemplary embodiment of the present invention has been explained, but the present invention is not limited to each of the exemplary embodiments explained above. The present invention can be carried out on the basis of a modification, a replacement, or an adjustment of each exemplary embodiment.

It should be noted that the present invention can also be carried out by combining the exemplary embodiments in any manner. More specifically, the present invention includes various kinds of modifications and corrections that can be achieved in accordance with all the disclosed contents and the technical spirit in this description.

The whole or part of the exemplary embodiments disclosed above can be described as, but not limited to, the following supplementary notes.

[Supplementary Note 1]

An optical reception apparatus comprising:

a reception unit for receiving wavelength multiplexed signal light; and a transmission unit for transferring an optical signal of a predetermined wavelength in accordance with an identifier included in the optical signal of the predetermined wavelength in the received wavelength multiplexed signal light.

[Supplementary Note 2]

The optical reception apparatus according to supplementary note 1, further comprising:

a storage unit for storing comparison information in advance; and a comparison unit for determining whether the identifier and the comparison information match each other or not, wherein in a case where the comparison unit determines that the identifier and the comparison information match each other, the transmission unit transfers the optical signal of the predetermined wavelength.

[Supplementary Note 3]

The optical reception apparatus according to supplementary note 1 or 2, wherein in a case where the comparison unit determines that the identifier and the comparison information do not match each other, the transmission unit discards the optical signal of the predetermined wavelength.

[Supplementary Note 4]

The optical reception apparatus according to any one of supplementary notes 1 to 3, further comprising:

a pattern generation unit for generating a predetermined pattern, wherein in a case where the comparison unit determines that the identifier and the comparison information do not match each other, the transmission unit outputs the optical signal of the predetermined wavelength including the predetermined pattern generated by the pattern generation unit.

[Supplementary Note 5]

The optical reception apparatus according to any one of supplementary notes 1 to 4, wherein the reception unit includes:

a demultiplexing unit for demultiplexing the received wavelength multiplexed signal light into the optical signal of the predetermined wavelength; and an input unit for receiving the optical signal of the predetermined wavelength demultiplexing by the demultiplexing unit, wherein the input unit outputs the optical signal of the predetermined wavelength to the comparison unit.

[Supplementary Note 6]

The optical reception apparatus according to any one of supplementary notes 1 to 4, wherein the reception unit includes:

a branch unit for branching the received wavelength multiplexed signal light; and an input unit for selectively receiving the optical signal of the predetermined wavelength in the wavelength multiplexed signal light branched by the branch unit, wherein the input unit outputs the received optical signal of the predetermined wavelength to the comparison unit.

[Supplementary Note 7]

An optical transmission apparatus comprising:

a reception unit for receiving an optical signal of a predetermined wavelength;

a transmission unit for incorporating an identifier uniquely identifying the optical transmission apparatus into the optical signal of the predetermined wavelength received by the reception unit, and transmitting the optical signal; and a multiplex unit for multiplexing and outputting the optical signal including the identifier and an optical signal of a wavelength different from the predetermined wavelength.

[Supplementary Note 8]

The optical transmission apparatus according to supplementary note 7, further comprising:

a pattern generation unit for generating a predetermined pattern, wherein the transmission unit transmits the optical signal of the predetermined wavelength including the predetermined pattern in accordance with a predetermined condition.

[Supplementary Note 9]

An optical communication system comprising:

an optical transmission apparatus including a first reception unit for receiving an optical signal of a predetermined wavelength, a first transmission unit for incorporating an identifier uniquely identifying the optical transmission apparatus into the optical signal of the predetermined wavelength received by the first reception unit, and transmitting the optical signal, and a multiplex unit for multiplexing and outputting the optical signal including the identifier and an optical signal of a wavelength different from the predetermined wavelength; and an optical reception apparatus including a second reception unit for receiving wavelength multiplexed signal light transmitted by the optical transmission apparatus, and a second transmission unit for transferring the optical signal of the predetermined wavelength in accordance with the identifier included in the optical signal of the predetermined wavelength in the received wavelength multiplexed signal light.

[Supplementary Note 10]

The optical communication system according to supplementary note 9, further comprising:

a relay apparatus for branching and multiplexing the optical signal of the predetermined wavelength in a wavelength multiplexed optical signal that is output by the optical transmission apparatus; and an optical transmission and reception apparatus for receiving an optical signal branched by the relay apparatus, and transmitting the optical signal of the predetermined wavelength to the relay apparatus, wherein in accordance with an occurrence of a fault in a transmission path between the relay apparatus and the optical transmission and reception apparatus, the relay apparatus switches the optical signal, which is to be output to the optical reception apparatus, from the optical signal of the predetermined wavelength transmitted by the optical transmission and reception apparatus to the optical signal of the predetermined wavelength transmitted by the optical transmission apparatus.

[Supplementary Note 11]

The optical communication system according to supplementary note 9 or 10, wherein the optical transmission apparatus further includes a pattern generation unit generating a predetermined pattern, and the first transmission unit transmits the optical signal of the predetermined wavelength including the predetermined pattern generated by the pattern generation unit in accordance with a predetermined condition.

[Supplementary Note 12]

The optical communication system according to supplementary note 11 further comprising:

a control apparatus detecting a fault that has occurred in the transmission path and notifying the fault to the optical transmission apparatus, wherein the optical transmission apparatus transmits the optical signal of the predetermined wavelength including the predetermined pattern in accordance with the notification from the control apparatus.

[Supplementary Note 13]

An optical communication method comprising:

receiving wavelength multiplexed signal light; and transferring an optical signal of a predetermined wavelength in accordance with an identifier included in the optical signal of the predetermined wavelength in the received wavelength multiplexed signal light.

[Supplementary Note 14]

The optical communication method according to supplementary note 13, comprising:

determining whether the identifier and comparison information stored in advance match each other or not; and transferring the optical signal of the predetermined wavelength in a case where the identifier and the comparison information are determined to match each other.

[Supplementary Note 15]

The optical communication method according to supplementary note 14, wherein in a case, determining that the identifier and the comparison information do not match each other, discarding the optical signal of the predetermined wavelength.

[Supplementary Note 16]

The optical communication method according to supplementary note 14 or 15, further comprising:

generating a predetermined pattern, wherein in a case, determining that the identifier and the comparison information do not match each other, outputting the optical signal of the predetermined wavelength including the predetermined pattern generated.

[Supplementary Note 17]

The optical communication method according to any one of supplementary notes 13 to 16, further including:

demultiplexing the received wavelength multiplexed signal light into the optical signal of the predetermined wavelength; and receiving the optical signal of the predetermined wavelength which is demultiplexing; and outputting the optical signal of the predetermined wavelength.

[Supplementary Note 18]

The optical communication method according to any one of supplementary notes 13 to 16, further including:

branching the received wavelength multiplexed signal light; and selectively receiving the optical signal of the predetermined wavelength in the wavelength multiplexed signal light which is branched; and outputting the received optical signal of the predetermined wavelength.

[Supplementary Note 19]

The optical transmission method according to any one of supplementary notes 13 to 18, further including:

receiving an optical signal of a predetermined wavelength;

incorporating an identifier uniquely identifying an apparatus itself into the optical signal of the predetermined wavelength which is received, and transmitting the optical signal; and multiplexing and outputting the optical signal including the identifier and an optical signal of a wavelength different from the predetermined wavelength.

[Supplementary Note 20]

The optical transmission method according to supplementary note 19 further including:

generating a predetermined pattern, and transmitting the optical signal of the predetermined wavelength including the predetermined pattern in accordance with a predetermined condition.

[Supplementary Note 21]

A program for causing a computer to execute:

processing for receiving wavelength multiplexed signal light; and processing for transferring optical signal of the predetermined wavelength in accordance with the identifier included in the optical signal of the predetermined wavelength in the received wavelength multiplexed signal light.

[Supplementary Note 22]

The program according to supplementary note 21, further comprising:

processing of determining whether the identifier and comparison information stored in advance match each other or not; and processing of transferring the optical signal of the predetermined wavelength in a case where the identifier and the comparison information are determined to match each other.

[Supplementary Note 23]

The program according to supplementary note 22, wherein in a case, determining that the identifier and the comparison information do not match each other, outputting the optical signal of the predetermined wavelength including the predetermined pattern which is generated.

[Supplementary Note 24]

The program according to supplementary note 22 or 23, further comprising:

processing of generating a predetermined pattern, and processing of transmitting the optical signal of the predetermined wavelength including the predetermined pattern in accordance with a predetermined condition.

[Supplementary Note 25]

The program according to any one of supplementary notes 21 to 24, further comprising:

processing of demultiplexing the received wavelength multiplexed signal light into the optical signal of the predetermined wavelength, processing of receiving the optical signal of the predetermined wavelength which is demultiplexing, and processing of outputting the optical signal of the predetermined wavelength.

[Supplementary Note 26]

The program according to any one of supplementary notes 21 to 24, further comprising:

processing of branching the received wavelength multiplexed signal light, processing of selectively receiving the optical signal of the predetermined wavelength in the wavelength multiplexed signal light which is branched, and processing of outputting the received optical signal of the predetermined wavelength.

[Supplementary Note 27]

The program according to any one of supplementary notes 21 to 26 further comprising:

processing of receiving an optical signal of a predetermined wavelength;

processing of incorporating an identifier uniquely identifying the optical transmission apparatus into the optical signal of the predetermined wavelength which is received, and transmitting the optical signal; and processing of multiplexing and outputting the optical signal including the identifier and an optical signal of a wavelength different from the predetermined wavelength.

[Supplementary Note 28] The program according to supplementary note 27 further comprising:

processing of generating a predetermined pattern, and processing of transmitting, in accordance with a predetermined condition, the optical signal of the predetermined wavelength including the predetermined pattern which is generated.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-199940, filed on Sep. 26, 2013, the disclosure of which is incorporated herein in its entirety by reference.

REFERENCE SIGNS LIST 1-1 optical reception apparatus
1-2 optical transmission apparatus
1-3 optical transmission and reception apparatus
10, 10-1, 10-2, 10-3, 10-4 base station
11 reception unit
12 transmission unit
13 comparison unit
14 storage unit
15 input unit
16 demultiplexing unit
17 branch unit
18 pattern generation unit
20 transmission path
21 reception unit
23 output unit
24 insertion unit
25 multiplex unit
30 BU
40, 40-1, 40-2, 40-3, 40-4 terminal apparatus
41, 41-1, 41-2, 41-3, 41-4, 41-5 transponder
42 client module
43 Framer LSI
44 insertion unit
45 line module
46 comparison unit
47 storage unit
48 pattern generation unit
50, 50-1, 50-2, 50-3, 50-4, 50-5 client apparatus
51, 51-1, 51-2, 51-3, 51-4 wavelength separation multiplex unit
61 encoding unit
62 decoding unit
70 EMS

The invention claimed is:

1. An optical branch apparatus arranged between an optical transmission apparatus and an optical reception apparatus,
the optical transmission apparatus including a first receiver for receiving an optical signal of a predetermined wavelength, a first transmitter for incorporating an identifier uniquely identifying the optical transmission apparatus into the optical signal of the predetermined wavelength received by the first receiver, and transmitting the optical signal, and a multiplexer for multiplexing and outputting the optical signal including the identifier and an optical signal of a wavelength different from the predetermined wavelength, and
the optical reception apparatus including a second receiver for receiving wavelength multiplexed signal light transmitted by the optical transmission apparatus, and a second transmitter for transferring the optical signal of the predetermined wavelength in accordance with the identifier included in the optical signal of the predetermined wavelength in the received wavelength multiplexed signal light,
wherein the optical branch apparatus branches and multiplexes the optical signal of the predetermined wavelength in a wavelength multiplexed optical signal that is output by the optical transmission apparatus, transmits the optical signal branched to an optical transmission and reception apparatus, and receives an optical signal of the predetermined wavelength from the optical transmission and reception apparatus, and wherein the optical branch apparatus, in accordance with an occurrence of a fault in a transmission path between the optical branch apparatus and the optical transmission and reception apparatus switches an optical signal that is to be output to the optical reception apparatus, from the optical signal of the predetermined wavelength transmitted by the optical transmission and reception apparatus to the optical signal of the predetermined wavelength transmitted by the optical transmission apparatus in such a way that a lost optical signal result from the fault is compensated by another optical signal.

2. The optical branch apparatus according to claim 1, wherein the optical transmission apparatus further includes a pattern generator generating a predetermined pattern, and the first transmitter transmits the optical signal of the predetermined wavelength including the predetermined pattern generated by the pattern generator in accordance with a predetermined condition.

3. The optical branch apparatus according to claim 2, wherein the optical transmission apparatus transmits the optical signal of the predetermined wavelength including the predetermined pattern in accordance with the notification from a control apparatus, the control apparatus detecting a fault that has occurred in the transmission path and notifying the fault to the optical transmission apparatus.

4. An optical communication method, comprising:
providing an optical branch apparatus arranged between an optical transmission apparatus and an optical reception apparatus, wherein the optical transmission apparatus comprises a first receiver, a first transmitter, and a multiplexer, and wherein the optical reception apparatus includes a second receiver and a second transmitter;
receiving, by the first receiver, an optical signal of a predetermined wavelength by the first receiver;
incorporating by the first transmitter an identifier uniquely identifying the optical transmission apparatus into the optical signal of the predetermined wavelength received by the first receiver, and transmitting, by the first transmitter, the optical signal;
multiplexing, by the multiplexer, and outputting the optical signal including the identifier and an optical signal of a wavelength different from the predetermined wavelength,
receiving, by the second receiver, wavelength multiplexed signal light transmitted by the optical transmission apparatus, and
transferring, by the second transmitter, the optical signal of the predetermined wavelength in accordance with the identifier included in the optical signal of the predetermined wavelength in the received wavelength multiplexed signal light,
by the optical branch apparatus, branching and multiplexing the optical signal of the predetermined wavelength in a wavelength multiplexed optical signal that is output by the optical transmission apparatus, transmitting the optical signal branched to an optical transmission and reception apparatus, and receiving an optical signal of the predetermined wavelength from the optical transmission and reception apparatus, and
in accordance with an occurrence of a fault in a transmission path between the optical branch apparatus and the optical transmission and reception apparatus, switching, by the optical branch apparatus, an optical signal that is to be output to the optical reception apparatus from the optical signal of the predetermined wavelength transmitted by the optical transmission and reception apparatus to the optical signal of the predetermined wavelength transmitted by the optical transmission apparatus in such a way that a lost optical signal result from the fault is compensated by another optical signal.

5. The optical communication method according to claim 4, wherein the optical transmission apparatus further includes a pattern generator generating a predetermined pattern, the method further comprising, transmitting, by the first transmitter, the optical signal of the predetermined wavelength including the predetermined pattern generated by the pattern generator in accordance with a predetermined condition.

6. The optical communication method according to claim 4, the method further comprising:

transmitting, by the optical transmission apparatus, the optical signal of the predetermined wavelength including the predetermined pattern; and in accordance with the notification from a control apparatus, detecting, by the control apparatus, a fault that has occurred in the transmission path and notifying the fault to the optical transmission apparatus.

\* \* \* \* \*